US008744214B2

(12) United States Patent
Snavely et al.

(10) Patent No.: US 8,744,214 B2
(45) Date of Patent: *Jun. 3, 2014

(54) NAVIGATING IMAGES USING IMAGE BASED GEOMETRIC ALIGNMENT AND OBJECT BASED CONTROLS

(71) Applicants: Microsoft Corporation, Redmond, WA (US); University of Washington, Seattle, WA (US)

(72) Inventors: Keith Noah Snavely, Ithaca, NY (US); Steven Maxwell Seitz, Seattle, WA (US); Richard Szeliski, Bellevue, WA (US)

(73) Assignees: Microsoft Corporation, Redmond, WA (US); University of Washington, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/898,697

(22) Filed: May 21, 2013

(65) Prior Publication Data

US 2013/0254666 A1 Sep. 26, 2013

Related U.S. Application Data

(60) Continuation of application No. 13/418,774, filed on Mar. 13, 2012, now Pat. No. 8,463,071, and a division of application No. 11/493,436, filed on Jul. 25, 2006, now Pat. No. 8,160,400.

(60) Provisional application No. 60/737,908, filed on Nov. 17, 2005.

(51) Int. Cl.
*G06K 9/00* (2006.01)
*G06K 9/36* (2006.01)

(52) U.S. Cl.
USPC .......... 382/284; 382/154; 382/294; 382/305; 345/419; 345/475

(58) Field of Classification Search
USPC ..................... 382/154, 284, 294, 305, 285; 345/419–427, 475
See application file for complete search history.

(56) References Cited

U.S. PATENT DOCUMENTS

| 4,752,836 A | 6/1988 | Blanton et al. |
| 4,873,585 A | 10/1989 | Blanton et al. |

(Continued)

OTHER PUBLICATIONS

Arya, S. et al., "An optimal algorithm for approximate nearest neighbor searching fixed dimensions," *Journal of the ACM* 45, 1998, 6, 891-923.

(Continued)

*Primary Examiner* — Aaron W Carter
(74) *Attorney, Agent, or Firm* — Steve Wight; Carole Boelitz; Micky Minhas

(57) ABSTRACT

Over the past few years there has been a dramatic proliferation of digital cameras, and it has become increasingly easy to share large numbers of photographs with many other people. These trends have contributed to the availability of large databases of photographs. Effectively organizing, browsing, and visualizing such .seas. of images, as well as finding a particular image, can be difficult tasks. In this paper, we demonstrate that knowledge of where images were taken and where they were pointed makes it possible to visualize large sets of photographs in powerful, intuitive new ways. We present and evaluate a set of novel tools that use location and orientation information, derived semi-automatically using structure from motion, to enhance the experience of exploring such large collections of images.

20 Claims, 10 Drawing Sheets

(56) References Cited

U.S. PATENT DOCUMENTS

| | | |
|---|---|---|
| 6,248,944 B1 | 6/2001 | Ito |
| 6,549,207 B1 | 4/2003 | Matsumoto |
| 6,754,400 B2 | 6/2004 | Florin et al. |
| 7,263,230 B2 | 8/2007 | Tashman |
| 7,353,114 B1 | 4/2008 | Rohlf et al. |
| 7,620,910 B2 | 11/2009 | Ohno et al. |
| 7,693,702 B1 | 4/2010 | Kerner et al. |
| 8,160,400 B2 | 4/2012 | Snavely et al. |
| 8,463,071 B2 | 6/2013 | Snavely et al. |
| 8,515,159 B2 | 8/2013 | Snavely et al. |
| 2002/0044128 A1 | 4/2002 | Hayashi et al. |
| 2002/0061065 A1 | 5/2002 | Moore |
| 2002/0113872 A1 | 8/2002 | Kinjo |
| 2003/0026469 A1 | 2/2003 | Kreang-Arekul et al. |
| 2005/0018082 A1 | 1/2005 | Larsen et al. |
| 2005/0129299 A1 | 6/2005 | Kreang-Arekul et al. |
| 2006/0184540 A1 | 8/2006 | Kung et al. |
| 2008/0150890 A1 | 6/2008 | Bell et al. |
| 2008/0150913 A1 | 6/2008 | Bell et al. |
| 2009/0031246 A1 | 1/2009 | Cowtan et al. |
| 2012/0262483 A1 | 10/2012 | Kim |

OTHER PUBLICATIONS

Brown, M. et al., "Unsupervised 3D object recognition and reconstruction in unordered datasets," *International Conference on 3D Imaging and Modeling,* Ontario, Canada, Jun. 13-16, 2005, 56-63.

Canny, J., "A computational approach to edge detection," *IEEE Trans. Pattern Anal. Mach. Intell.,* 1986, 8(6), 679-698.

Debevec, P. E. et al., "Modeling and rendering architecture from photographs: a hybrid geometry- and image-based approach," *SIGGRAPH '96: Proceedings of the 23rd annual conference on Computer graphics and interactive techniques,* ACM Press, New York, NY, USA, 1996, 11-20.

Yahoo, Inc., "Popular Tags on Flickr Photo Sharing," *Flickr,* http://www.flickr.com/photos/tags, 2006, 2 pages.

Hartley, R. I. et al., *Multiple View Geometry in Computer Vision,* second ed. Cambridge University Press, 2004.

Johansson, B. et al., "A system for automatic pose-estimation from a single image in a city scene," *IASTED Int. Conf. Signal Processing, Pattern Recognition and Applications,* Crete, Greece, Jun. 25-28, 2002, 68-73.

Lourakis, M. I. et al., "The design and implementation of a generic sparse bundle adjustment software package based on the levenberg-marquardt algorithm," Tech. Rep. 340, *Institute of Computer Science—Forth, Heraklion,* Crete, Greece, Aug. 2004.

Mikolajczyk, K. et al., "A performance evaluation of local descriptors," *IEEE Transactions on Pattern Analysis & Machine Intelligence,* 2005, 27(10), 1615-1630.

Rubner, Y. et al., "A metric for distributions with applications to image databases," *Int'l Conf. on Computer Vision (ICCV),* 1998, 59-66.

Schaffalitzky, F. et al., "Multi-view matching for un-ordered image sets, or How do I organize my holiday snaps?" *Proceedings of the 7$^{th}$ European Conference on Computer Vision,* Copenhagen, Denmark, May 28-31, 2002, 1, 414-431.

Sutherland, I. E., "Sketchpad: a man-machine graphical communication system," *Proceedings—Spring Joint Computer Conference,* 1963, 329-346.

Szeliski, R., "Image alignment and stitching: A tutorial," Tech. Rep. MSR-TR-2004-92, Microsoft Research, 2004, 1-57.

Werner, T. et al., "New techniques for automated architecture reconstruction from photographs," *Proceedings of the 7th European Conference on Computer Vision,* Copenhagen, Denmark, May 28-31, 2002, 2, 541-555.

Microsoft Co., "What can you do with a gazillion photos on a single database indexed by their locations?" *World-Wide Media eXchange: WWMX,* http://www.wwmx.org, Apr. 7, 2005, downloaded Sep. 27, 2006, 2 pages.

Yeh, T. et al., "Searching the web with mobile images for location recognition," *CVPR* (2), 2004, 76-81.

TED Talk—"Blaise Aguera y Arcas demos Photosynth" filmed Mar. 2007 at TED conference in Monterey, California, available to view at: http://www.ted.com/talks/lang/eng/blaise.sub.--aguera.sub.--y. sub.--arcas-.sub.--demos.sub.--photosynth.html.

Toyama et al., "Geographic Location Tags on Digital Images", MM '03, Nov. 2-8, 2003, Berkeley, California, USA. Copyright 2003 ACM.

NAVIGATING IMAGES USING IMAGE BASED GEOMETRIC ALIGNMENT AND OBJECT BASED CONTROLS

CROSS-REFERENCE TO RELATED APPLICATIONS

The instant application is a continuation application of, and claims priority to, U.S. patent application Ser. No. 13/418,774, filed Mar. 13, 2012, which issued Jun. 11, 2013 with U.S. Pat No. 8,463,071. U.S. patent application Ser. No. 13/418,774 is a divisional application of U.S. patent application Ser. No. 11/493,436, filed Jul. 25, 2006, which issued Apr. 17, 2012, with U.S. Pat. No. 8,160,400. U.S. patent application Ser. No. 11/493,436 claims priority to U.S. provisional patent application No. 60/737,908, filed Nov. 17, 2005. U.S. patent application Ser. No. 13/418,774 is incorporated herein in its entirety. U.S. patent application Ser. No. 11/493,436 is incorporated herein in its entirety. U.S. Pat. No. 8,160,400 is incorporated herein in its entirety. U.S. provisional patent application No. 60/737,908 is incorporated herein in its entirety.

GOVERNMENT RIGHTS

The subject matter disclosed herein was made with government support using award No. IIS-0413198and DGE0203031awarded by the National Science Foundation. The Government has certain rights in the disclosed subject matter.

BACKGROUND

Digital cameras have become commonplace, and advances in technology have made it easy for a single person to take thousands of photographs and store all of them on a hard drive. At the same time, it has become much easier to share photographs with others, whether by posting them on a personal web site, or making them available to a community of enthusiasts using a photo-sharing service. As a result, anyone can have access to millions of photographs through the Internet. Sorting through and browsing such huge numbers of photographs, however, is a challenge. At the same time, large collections of photographs, whether belonging to a single person, or contributed by thousands of people, create exciting opportunities for enhancing the browsing experience by gathering information across multiple photographs. Some photo-sharing services, such as FLICKR®, available at www.flickr.com, allow users to tag photos with keywords, and provide a text search interface for finding photos. However, tags alone often lack the level of specificity required for fine-grained searches, and can rarely be used to organize the results of a search effectively. For example, searching for "Notre Dame" in FLICKR® results in a list of thousands of photographs, sorted either by date or by other users' interest in each photo. Within this list, photographs of both the inside and the outside of Notre Dame cathedral in Paris are interspersed with photographs taken in and around the University of Notre Dame.

Finding a photograph showing a particular object, for instance, the door of the cathedral, amounts to inspecting each image in the list. Searching for both "Notre Dame" and "door" limits the number of images to a manageable number, but almost certainly excludes relevant images whose owners simply omitted the tag "door."

The computer vision community has conducted work on recovering camera parameters and scene geometry from sets of images. The work of Brown and Lowe [2005] and of Schaffalitzky and Zisserman [2002] involves application of automatic structure from motion to unordered data sets. A more specific line of research focuses on reconstructing architecture from multiple photographs, using semi-automatic or fully automatic methods. The semi-automatic Facade system of Debevec, et al. [1996] has been used to create compelling fly-throughs of architectural scenes from photographs. Werner and Zisserman [2002] developed an automatic system for reconstructing architecture, but was only demonstrated on small sets of photographs.

Techniques have been developed for visualizing or searching through large sets of images based on a measure of image similarity (histogram distances such as the Earth Mover's Distance [Rubner et al. 1998] are often used). A similarity score gives a basis for performing tasks such as creating spatial layouts of sets of images or finding images that are similar to a given image, but often the score is computed in a way that is agnostic to the objects in the scene (for instance, the score might just compare the distributions of colors in two objects). Therefore, these methods are most suitable for organizing images of classes of objects, such as mountains or sunsets.

Finally, several tools have been developed for organizing large sets of images contributed by a community of photographers. For example, the World-Wide Media eXchange (WWMX) is one such tool. WWMX allows users to contribute photographs and provide geo-location information by using a GPS receiver or dragging and dropping photos onto a map. However, the location information may not be extremely accurate, and the browsing interface of WWMX is limited to an overhead map view. Other photo-sharing tools, such as FLICKR®, do not explicitly use location information to organize users' photographs, although FLICKR® supports tools such as "Mappr" for annotating photos with location, and it is possible to link images in FLICKR® to external mapping tools such as GOOGLE® Earth.

Finally, the following references are relevant to the description of the invention.

ARYA, S., MOUNT, D. M., NETANYAHU, N. S., SILVERMAN, R., AND WU, A. Y. 1998. An optimal algorithm for approximate nearest neighbor searching fixed dimensions. *Journal of the ACM* 45, 6, 891-923.

BROWN, M., AND LOWE, D. G. 2005. Unsupervised 3D object recognition and reconstruction in unordered datasets. In *International Conference on 3D Imaging and Modeling*.

CANNY, J. 1986. A computational approach to edge detection. *IEEE Trans. Pattern Anal. Mach. Intell.* 8, 6, 679-698.

DEBEVEC, P. E., TAYLOR, C. J., AND MALIK, J. 1996. Modeling and rendering architecture from photographs: a hybrid geometry-and image-based approach. In *SIGGRAPH '96: Proceedings of the 23rd annual conference on Computer graphics and interactive techniques,* ACM Press, New York, N.Y., USA, 11-20.

Flickr. http://www.flickr.com.

HARTLEY, R. I., AND ZISSERMAN, A. 2004. *Multiple View Geometry in Computer Vision,* second ed. Cambridge University Press, ISBN: 0521540518.

JOHANSSON, B., AND CIPOLLA, R. 2002. A system for automatic pose-estimation from a single image in a city scene. In *IASTED Int. Conf Signal Processing, Pattern Recognition and Applications*.

LOURAKIS, M. I., AND ARGYROS, A. A. 2004. The design and implementation of a generic sparse bundle adjustment software package based on the levenberg-marquardt algorithm. Tech. Rep. 340, Institute of Computer Science— FORTH, Heraklion, Crete, Greece, Aug. Available from http://www.ics.forth.ge/~lourakis/sba.

MIKOLAJCZYK, K., AND SCHMID, C. 2005. A performance evaluation of local descriptors. *IEEE Transactions on Pattern Analysis & Machine Intelligence* 27, 10, 1615-1630.

RUBNER, Y., TOMASI, C., AND GUIBAS, L. J. 1998. A metric for distributions with applications to image databases. In *Int'l Conf. on Computer Vision (ICCV)*, 59-66.

SCHAFFALITZKY, F., AND ZISSERMAN, A. 2002. Multi-view matching for n-ordered image sets, or "How do I organize my holiday snaps?" In *Proceedings of the 7th European Conference on Computer Vision*, Copenhagen, Denmark, vol. 1, 414-431.

SUTHERLAND, I. E. 1964. Sketchpad: a man-machine graphical communication system. In *DAC '64: Proceedings of the SHARE design automation workshop*, ACM Press, New York, N.Y., USA, 6.329-6.346.

SZELISKI, R. 2005. Image alignment and stitching: A tutorial. Tech. Rep. MSR-TR-2004-92, Microsoft Research.

WERNER, T., AND ZISSERMAN, A. 2002. New techniques for automated architecture reconstruction from photographs. In *Proceedings of the 7th European Conference on Computer Vision*, Copenhagen, Denmark, vol. 2, 541-555.

WWMX. World-Wide Media eXchange. http://www.wwmx.org.

YEH, T., TOLLMAR, K., AND DARRELL, T. 2004. Searching the web with mobile images for location recognition. In *CVPR* (2), 76-81.

SUMMARY

Many collections of photos can be organized, browsed, and visualized more effectively using more fine-grained knowledge of location and orientation. As a simple example, if, in addition to knowing simply that a photograph was taken at a place called "Notre Dame" we know the latitude and longitude the photographer was standing along with the precise direction he was facing, then an image of the door to Notre Dame cathedral can be found more easily by displaying search hits on a map interface, and searching only among the images that appear in front of the cathedral door.

As well as improving existing search tools, knowing where a photo was taken makes many other browsing modes possible. For instance, relating images by proximity makes it possible to find images that were taken nearby, or to the left of, or north of, a selected image, or to find images that contain a close-up of a part of another image. With knowledge of location and orientation, it is easier to generate morphs between similar photographs, which can make the relationship between different images more explicit, and a browsing experience more compelling. Location and orientation information can be combined with other metadata, such as date, time, photographer, and knowledge of correspondence between images, to create other interesting visualizations, such as an animation of a building through time. With additional knowledge of the geometry of the scene, location information also allows tags associated with parts of one photograph to be transferred to other similar photographs. This ability can improve text searches, and the access to additional information for each photo can further enhance the browsing experience.

These browsing tools can be applied to a single user's photo collection, a collection of photos taken for a special purpose (such as creating a virtual tour of a museum), or a database containing photos taken by many different people.

We also describe herein new tools and interfaces for visualizing and exploring sets of images based on knowledge of three-dimensional (3D) location and orientation information, and image correspondence. We present semi-automatic techniques for determining the relative and absolute locations and orientations of the photos in a large collection. We present an interactive image exploration system. These and other aspects and embodiments of the invention are described in detail below.

BRIEF DESCRIPTION OF THE DRAWINGS

The systems and methods for navigating images using image based geometric alignment and object based controls in accordance with the present invention are further described with reference to the accompanying drawings in which.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

The systems and methods for navigating images using image based geometric alignment and object based controls described herein have been applied to a variety of data sets comprising images from various locations. Thus, the various techniques and figures discussed may make occasional reference to the tested data sets. Tested data sets include, for example, a set of photographs of the Old Town Square in Prague, Czech Republic, a set of photographs taken along the Great Wall of China, a set of photos resulting from an internet search for "notredame AND paris," a set of photos resulting from an internet search for "halfdome AND Yosemite," a set of photos resulting from an internet search for "trevi AND rome," and a set of photos resulting from an internet search for "trafalgarsquare."

General Operating Environment

Figure 1:
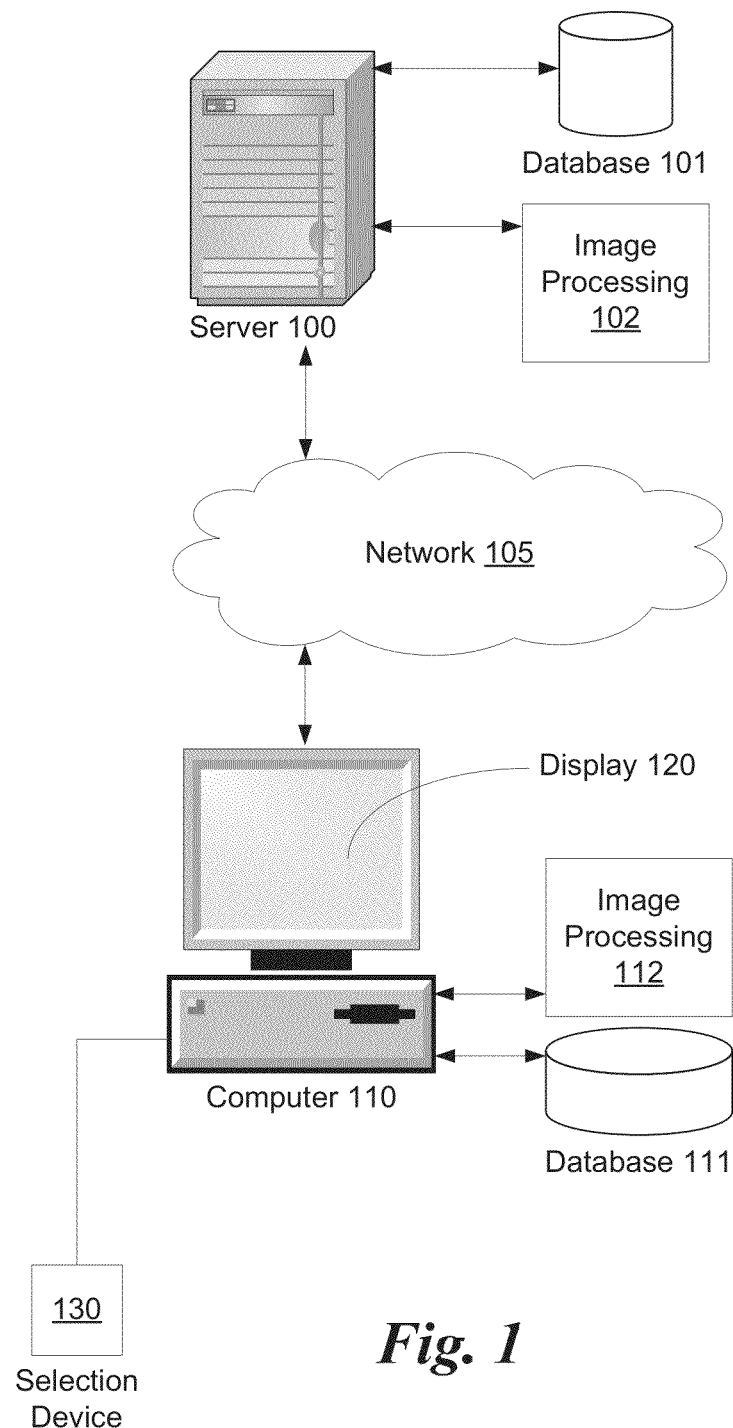
FIG. 1 illustrates a general operating environment for the invention.

FIG. 1 presents a general operating environment for aspects of the invention. In general, computer hardware and software such as that depicted in FIG. 2 may be arranged in any configuration and using the full extent of presently available or later developed computing and networking technologies. In one configuration, a server 100 may be connected to a network 105 such as the internet. The server 100 may receive and respond to requests from client computers such as 110 that are also coupled to the network 105. Server 100 may be equipped with or otherwise coupled to a database or data store 101 containing images such as digital photographs, as well as metadata or other useful information that can be used to categorize and process the images. Server 100 may also be equipped with or otherwise coupled to image processing logic 102 for carrying out various processing tasks as discussed herein.

Thus, in one arrangement, a client 110 may request data from a server 100 via network 105. The request may be in the form of a browser request for a web page, or by other means as will be appreciated by those of skill in the art. The server 100 may provide the requested information, which can be used by the client 110 to present a user interface on display 120. A user can interact with the user interface by activating selectable objects, areas, icons, tools and the like using a selection device 130 such as a mouse, trackball or touchpad. In connection with providing such information, the server 100 may access database 101 for appropriate images and may apply image processing logic 102 as necessary. Certain image processing logic in 102 may also be applied before and after the client request to properly prepare for and if necessary recover from satisfaction of the client 110 request. In connection with displaying the requested information, client 110 may, in some embodiments, access its own database 111 and image processing 112, for example when the client 110 and server each contain information to be presented in a particular user interface on electronic display 120. In other embodiments, the client 110 may simply rely on the server 100 to provide substantially all of the image processing functions associated with carrying out the invention.

In another arrangement, the client 110 may implement the systems and methods of the invention without relying on server 100 or network 105. For example, client 110 may contain images in database 111, and may apply image processing logic 112 to the images to produce a user interface that can be presented to a user via display 120. Thus, while the invention can be performed over a network using client/server or distributed architectures as are known in the art, it is not limited to such configurations and may also be implemented on a stand-alone computing device.

The description and figures presented herein can be understood as generally directed to hardware and software aspects of carrying out image processing logic such as 102 and 112 that produces at least in part a user interface that may be presented on an electronic display 120. Many of the remaining figures, as will be appreciated, are directed to exemplary aspects of a user interface that may be presented on a display 120. Aspects of the invention comprise novel features of such user interfaces, as will be appreciated, and optionally also supporting logic 112, 102 that produces such aspects of user interfaces or that processes images such that they may be presented in a user interface as disclosed herein.

Determining Geo-Location

In order to effectively use our browsing tools on a particular set of images, we need fairly accurate information about the location and orientation of the camera used to take each photograph in the set. In addition to these extrinsic parameters, it is useful to know the intrinsic parameters, such as the focal length, of each camera. How can this information be derived? GPS is one way of determining position, and while it is not yet common for people to carry around GPS units, nor do all current GPS units have the accuracy we desire, a first solution is to equip digital cameras with GPS units so that location and orientation information can be gathered when a photograph is taken. As for the intrinsic parameters, many digital camera models embed the focal length with which a photo was taken (as well as other information, such as exposure, date, and time) in the Exchangeable Image File Format (EXIF) tags of the image files. EXIF is the present standard for image metadata, but any image metadata may also be used. However, EXIF and/or other metadata values are not always accurate.

A second solution does not rely on the camera to provide accurate location information; instead, we can derive location using computer vision techniques. Brown and Lowe 2005 provides useful background for this discussion. We first detect feature points in each image, then match feature points between pairs of images, keeping only geometrically consistent matches, and run an iterative, robust structure from motion procedure to recover the intrinsic and extrinsic camera parameters. Because structure from motion only estimates the relative position of each camera, and we are also interested in absolute coordinates (e.g., latitude and longitude), we use a novel interactive technique to register the recovered cameras to an overhead map. A flowchart of the overall process is shown in FIG. 2.

Figure 2:
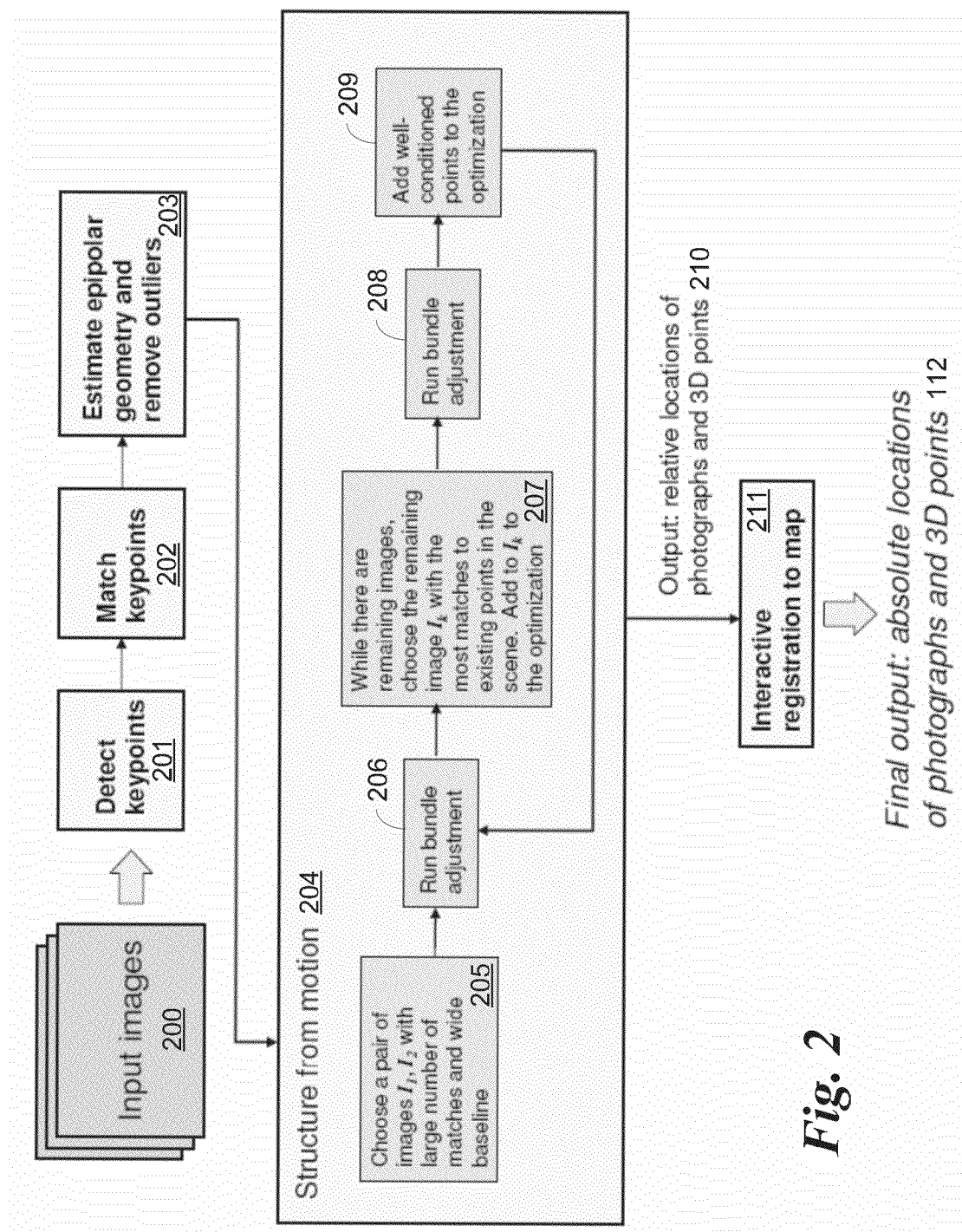
FIG. 2 illustrates an exemplary method for determining relative and absolute location information for a plurality of digital photographs.

As can be observed in FIG. 2, a set of input images 200 can be processed through a variety steps as may be carried out by one or more computer software and hardware components, to ultimately produce information regarding the absolute location of the input images (photographs), and the 3D points within such images 212. Exemplary steps can include keypoint detection 201, keypoint matching 202, estimating epipolar geometry and removing outliers 203, applying a structure from motion procedure 204 that produces an output comprising the relative locations of photographs and 3D points 210, and map registration 211.

The exemplary structure from motion procedure 204 may comprise choosing a pair of images $I_1$ and $I_2$ with a large number of matches and wide baseline 205, running bundle adjustment 206, choosing a remaining image $I_k$ with the most matches to existing points in the scene and adding image $I_k$ to the optimization 207, again running bundle adjustment as necessary 208, adding well-conditioned points to the optimization 209. Additional images can be processed as necessary by returning to step 206. After all images are processed, output 210 can be used in map registration 211 as described above. Various exemplary aspects of a system such as that of FIG. 2 are discussed in greater detail in the below sections, entitled "keypoint detection and matching," "structure from motion," "interactive registration to overhead map," "registering new photographs," and "line segment reconstruction."

Keypoint Detection and Matching

Detecting feature points in a plurality of images and matching feature points between two or more of said plurality of images may comprise the following procedures for estimating image location. The first step is to use a keypoint detector, such as any of the various keypoint detectors described in Mikolajczyk and Schmid 2005. A keypoint detector detects keypoints for each image. We then match keypoint descriptors between each pair of images. This can be done, for example, using the approximate nearest neighbors technique of Arya et al. 1998. Any other acceleration technique could also be used, including but not limited to hashing or context-sensitive hashing. For each image pair with a large enough number of matches, we estimate a fundamental matrix using, for example Random Sampling Consensus (RANSAC), or any other robust estimation technique, and remove the matches that are outliers to the recovered fundamental matrix. After finding a set of putative, geometrically consistent matches, we organize the matches into a set of tracks, where a track is simply a set of mutually matching keypoints; each track ideally contains projections of the same 3D point.

If the keypoints in every image form the vertex set of a graph, and there is an edge in the graph between each pair of matching keypoints, then every connected component of this graph comprises a track. However, the tracks associated with some connected components might be inconsistent; in particular, a track is inconsistent if it contains more than one keypoint for the same image. We keep only the consistent tracks containing at least two keypoints for the next phase of the location estimation procedure. Note that this simple rejection of nominally inconsistent tracks will not reject all physically inconsistent tracks (i.e., tracks that contain keypoints that are projections of different 3D points).

Structure from Motion

Next, we wish to determine a plurality of relative locations of said images. This step can comprise recovering a set of camera parameters and a 3D location for each track. We make the common assumption that the intrinsic parameters of the camera have a single degree of freedom, the focal length. The recovered parameters should be geometrically consistent, in that when each track is projected into each image that observes that track, the distance between the projected point and the detected keypoint is low. Recovering the parameters can be formulated as a non-linear least squares problem. In particular, we have a set of n cameras, parameterized by position $c_i$, orientation $R_i$ (expressed using three parameters as an iterative update to an initial rotation matrix), and focal length $f_i$; we group these parameters into a single parameter vector $\theta_i$.

We also have a set of m tracks, parameterized by 3D location, $p_j$. If we assume that each camera observes each track, then we also have a set of 2D projections, $q_{ij}$, where $q_{ij}$ is the observed projection of the j-th track in the i-th camera. Let $P(\theta, p)$ be the projection equation, i.e., the equation that maps 3D points to their 2D projections on a camera with parameters $\theta$. P first transforms p to the camera's coordinate system, then performs the perspective division and multiplies by the focal length to transform the result to image coordinates:

$$p'(\theta, p) = R(p-c)$$

$$P(\theta, p) = [-fp'_x/p'_z, -fp'_y/p'_z]^T$$

The quantity we wish to minimize is the sum of the reprojection errors:

$$\sum_{i=1}^{n} \sum_{j=1}^{m} w_{ij} \|q_{ij} - P(\theta_i, p_j)\|$$

(In practice, not every track will be observed by every camera, so $w_{ij}$ is used as an indicator variable; $w_{ij}=1$ if camera i observes point j, and $w_{ij}=0$ otherwise).

This non-linear optimization problem can be solved with algorithms such as Levenberg-Marquardt. Such algorithms are only guaranteed to find local minima, however, so it is important to provide them with a good initial estimate of the parameters. Rather than try to estimate the parameters of all cameras and tracks at once, then, we take an incremental approach in which we add in cameras one at a time with careful initial parameter estimates.

In this incremental procedure, we start out by estimating the parameters of a single pair of cameras, and the locations of the tracks seen by that pair. As a heuristic, we choose a pair of images that have a large number of matches, but whose matches cannot be well-modeled by a homography (indicating that the displacement between the two cameras is relatively large compared with the distance to the scene). Next, we choose the camera that observes that largest number of tracks whose locations have already been estimated, and add that camera into the optimization. We initialize the new camera's extrinsic parameters using the Direct Linear Transform (DLT) technique described in Sutherland 1964, although any of a variety of well-known camera calibration techniques could be used. We initialize the focal length to either the estimate obtained from the EXIF tags for that image (if one exists), or to the focal length estimated using DLT. We then rerun the optimization to refine the parameters for each of the cameras.

Finally, we add tracks observed by the new camera into the optimization. A track is added if it is observed by at least one other camera whose parameters have already been estimated, and only if that camera is far enough away from the new camera that we can get a well-conditioned estimate of the location of the track. We initialize the 3D location of each new track using triangulation. This procedure is repeated until no more cameras can be added to the optimization.

As described so far, our optimization technique is not robust to outliers, i.e., tracks that contain projections of multiple 3D points. We make it more robust with two modifications: first, when estimating the initial location and orientation of a camera, we apply the DLT technique in conjunction with RANSAC. Second, after every run of the optimization, we reject as outliers tracks that contain at least one keypoint with a high reprojection error. If any outliers are rejected, we rerun the optimization.

To solve the optimization at every iteration, we use the technique of bundle adjustment, for example, the technique described in Hartley and Zisserman 2004 is one workable option. In particular, the sparse bundle adjustment technique of Lourakis and Argyros 2004 is another workable option that may be preferable in some circumstances. This technique takes advantage of the sparseness of the problem to find a minimum in a reasonable amount of time and using a reasonable amount of memory even for large numbers of points and cameras.

Interactive Registration to Overhead Map

The final step of the location estimation process is to determine based on an absolute location of at least one of said images a plurality of absolute locations of said images. This step can determine the absolute coordinates, for example latitude and longitude, of each camera. The structure from motion procedure estimates relative image locations. If the relative locations have been estimated perfectly in that step, then the relative locations are related to the absolute locations by a similarity transform (global translation, rotation, and uniform scale). Our approach for determining the correct transformation is to have a user interactively align the recovered camera locations and 3D points with a satellite image or floor plan. First, the user must provide an appropriate image. Next, to assist the user in the alignment, we estimate the "up" direction in the image by fitting a plane to the recovered camera centers (this assumes that all the photographs were taken from approximately the same height). The normal to this plane is taken to be the up vector; to resolve the ambiguity of whether the normal points upwards or downwards, we assume that pictures are more often taken with the camera held right-side-up rather than up-side-down, and pick the direction that agrees with the orientation of the majority of the images. An alternate technique for estimating the up vector is given in Szeliski 2005, and is also considered workable in embodiments of the invention. The scene is then rendered superimposed on the alignment image, using an orthographic projection with the camera positioned above the scene, pointed downward.

Next, the user can align the recovered geometry to the alignment image in one of two ways. First, the user can manually rotate, translate, and scale the model until it is in agreement with the alignment image. If the up vector was determined accurately, the user needs only to rotate the model in 2D, rather than 3D. We have observed that it is often fairly easy to perform this alignment by matching the recovered points to features, such as building facades, visible in the image.

Figure 3:
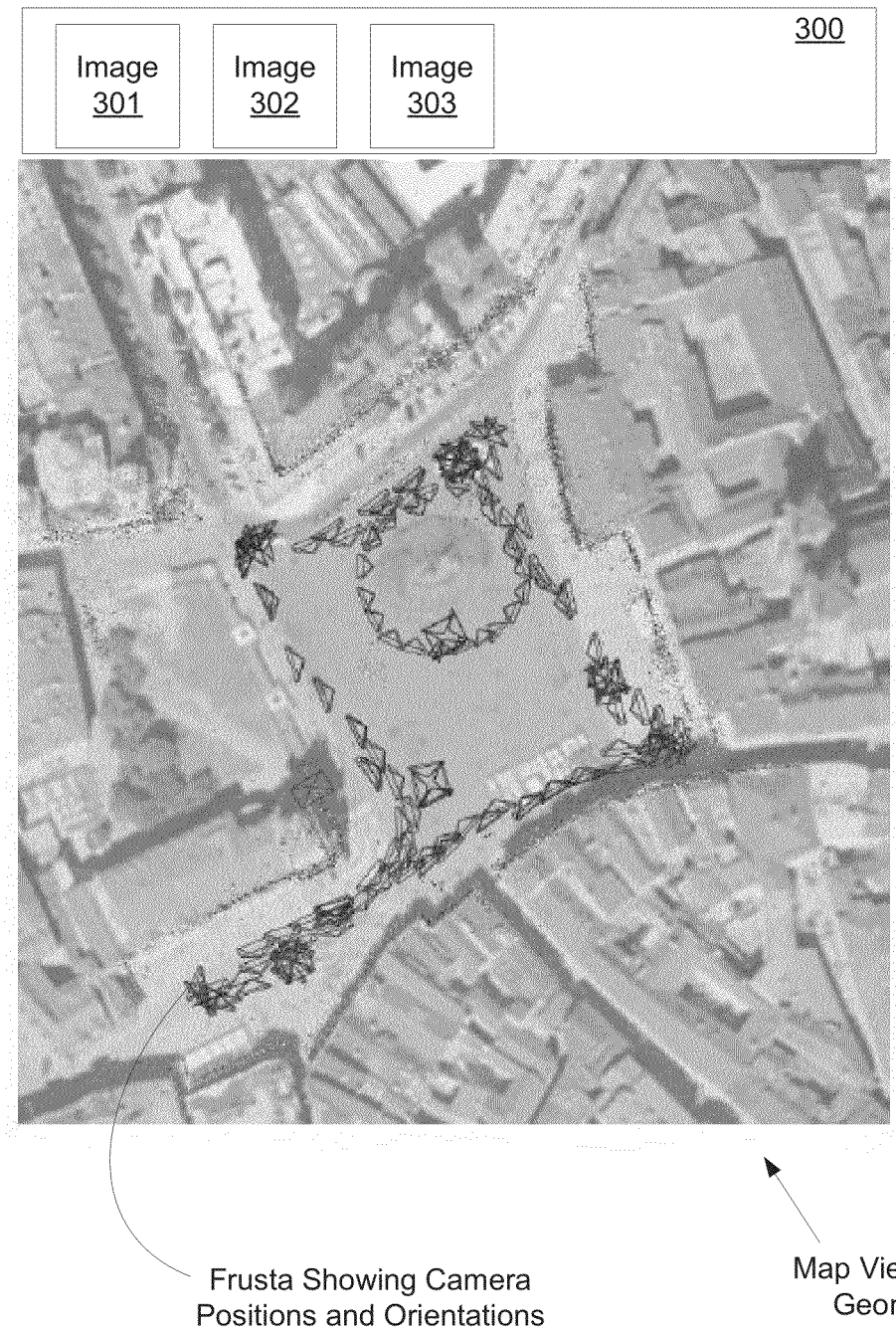
FIG. 3 illustrates an exemplary overhead map interface that may be used, in one embodiment, for registering new photographs in a photo set, and in another embodiment, for browsing photos by selecting from the map a camera location that is desired for viewing.

A screenshot showing a model recovered from the Prague data set that has been manually aligned to a satellite image is shown in FIG. 3. In FIG. 3, camera positions and orientations are represented as a plurality of frusta overlaid on top of an overhead map. Second, a user can also drag and drop a few images to their approximate locations on the map. Our system then computes the best similarity transform as each image is added, then renders the transformed model. Once a camera has been positioned on the map, it can be dragged around to refine the fit. When the user is satisfied with the alignment, the similarity transform is stored for future use.

It can sometimes happen that the recovered scene geometry is inaccurate, and no similarity transform will result in a good alignment with the provided image. For instance, if a set of photographs of building facades were taken while walking down a city street, the recovered camera positions may exhibit a slight curve instead of being perfectly straight. Inaccuracies like these can sometimes be corrected by taking a denser set of photographs, or by correcting the images for radial distortion. We also allow the user to interactively correct mistakes in the geometry by first using the alignment tools to find an approximate similarity transform, then dragging one or more cameras to more accurate positions and rerunning the optimization.

Registering New Photographs

Once the locations of an initial set of photographs has been estimated, new photographs can be registered in several ways. First, keypoints in the new photo can be matched with a set of representative feature descriptors computed for each track in the original set of images, and the position of the new photo can then be estimated using our structure from motion procedure. Second, the user can drag the new photo onto the map at the approximate location of that photograph. The location of that photo is then estimated in the same way, but its keypoints are matched with a more limited number of tracks (those visible in nearby images). This makes the image snap into place more quickly.

Line Segment Reconstruction

Once we know the relative locations of each of the photographs, we optionally reconstruct 3D line segments in the scene from the photos. Line segments can be useful for generating more convincing morphs between images and for creating non-photorealistic renderings, such as renderings comprising constructions of 3D scenes using lines and points, sometimes referred to as "wireframe" renderings of architectural scenes. We reconstruct 3D line segments as follows:

1. Detect 2D line segments in each image.
2. Derive a set of candidate matches by comparing line segments between pairs of nearby images.
3. Find sets of mutually consistent matches (line tracks) above a certain size. Triangulate the matching 2D line segments to obtain a 3D line segment.

The steps above will now be described in more detail. To detect 2D line segments, we use Canny edge detection as described in Canny 1986. Any edge detection technique may be selected. Edge detection is followed by an edge-linking step to form edge chains. Next, for each edge chain, we fit a line to the chain, and break the chain at the point of the chain furthest from the line; we recursively apply this procedure until all chains approximate line segments. Finally, we remove chains smaller than a threshold, and store the two endpoints of the line segment approximation of each of the remaining chains. We will use S(I) to denote the set of line segments found in image I.

To match line segments between pairs of images, we first compute a neighbor relation on the set of images. Two images are defined as neighbors if they are pointing in approximately the same direction and the number of 3D points both images observe is above a threshold. In addition, the images cannot be too close together (to ensure that triangulating matching segments is well-conditioned). Next, for each pair of matching images I and J, we consider each line segment s∈ S(I). Each line segment t∈ S(J) is labeled as a candidate match of s if t meets the following two conditions:

1. The endpoints of t are not too far away from the epipolar lines of the endpoints of s in image J.
2. The $L_2$ distance between a strip of intensity values around s and a strip of intensity values around t is not too large.

The intensity values are sampled along epipolar lines, and each strip is normalized for bias and gain before their $L_2$ distance is computed. For line segments on the edge of a building or other structure, one side of the segment might be part of the background in one or both of the images. Therefore, rather than using the strict $L_2$ distance, we divide the intensity strips into two halves on either side of the line segment, compute the $L_2$ distance between the two halves, and keep the minimum of the two distances. After computing candidate matches between pairs of neighbors, we consider connected components of candidate matches, as we did with keypoints in the "Keypoint Detection and Matching" section, above. Unlike with the keypoint matching, however, we now know where each photograph was taken, so we can check connected components for physical consistency. For each connected component of matches with a subset of consistent line segments of size at least four, we triangulate the consistent matches and store the resulting 3D line segment.

Photo Browsing User Interface

Once a set of photographs of a scene has been registered as described in the above sections or via any processes or procedures that yield the same or similar result, the user can browse the photographs with a photo browsing user interface. In the following sections, we describe aspects of an exemplary photo browsing user interface. Aspects of the user interface may be mixed and matched in a variety of ways, and can be usefully grouped into separate and distinct browsing modes. To activate features of the user interface or switch between different browsing modes, a user may select an appropriate button in the user interface, or may select an item from a menu provided in the user interface. The following sections are thus directed to aspects of an exemplary interface and browsing modes that may be used to usefully group such aspects.

User Interface Layout

Figure 4:
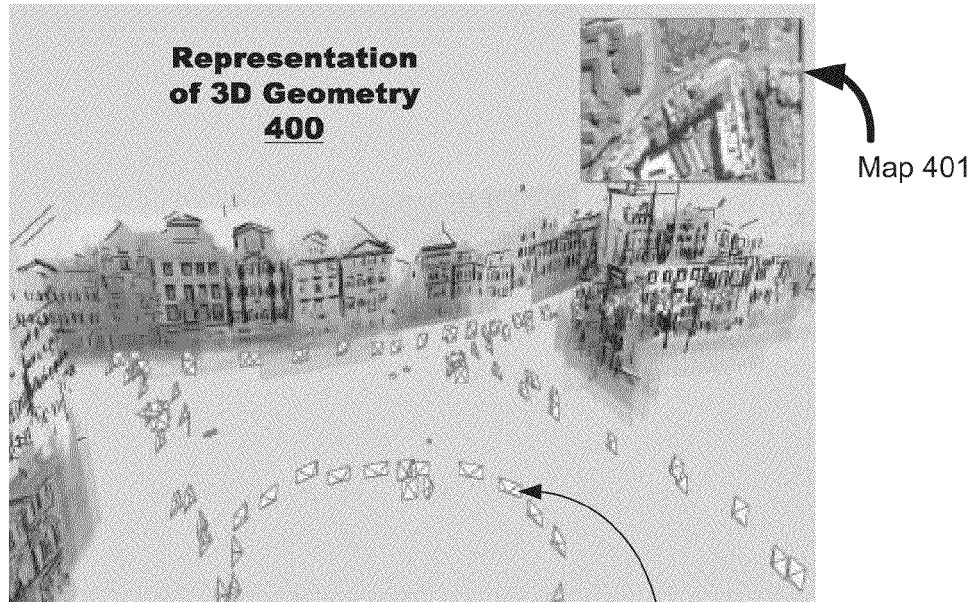
FIG. 4 illustrates a plurality of user interface features in an exemplary "free-flight" browsing mode, in which a user can move a virtual camera in a representation of a 3D geometry and select desired camera positions for viewing a corresponding digital photo.
Figure 5:
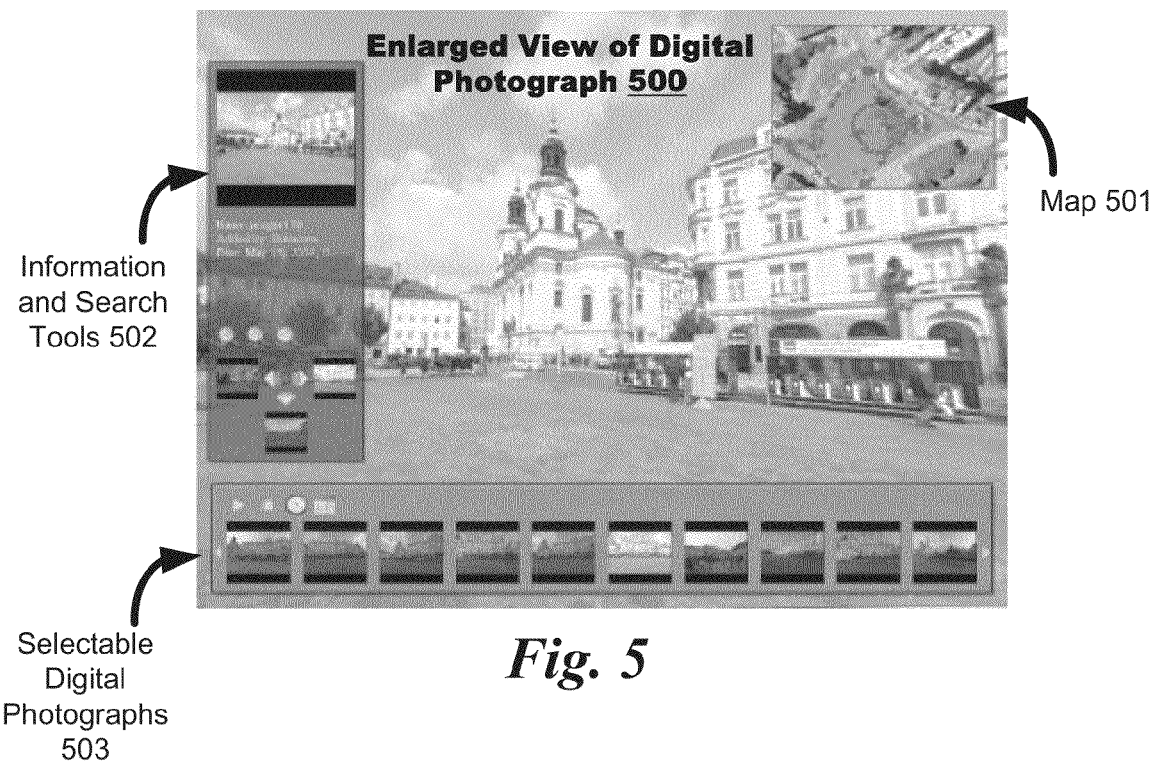
FIG. 5 illustrates a plurality of user interface features in an exemplary "image-based" browsing mode, in which a user may see a first photograph in a main location in the interface and also have access to a plurality of selectable alternate images that may have image content related to the first photograph.
Figure 6:
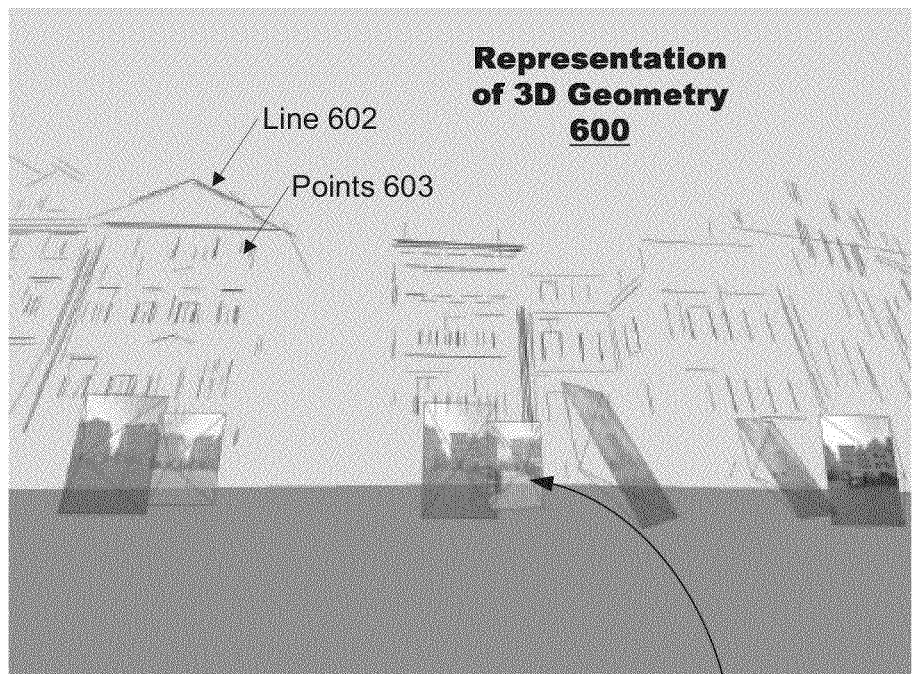
FIG. 6 illustrates another exemplary embodiment of a "free flight" browsing mode such as presented in FIG. 4.

FIG. 4 shows a screen shot from an exemplary photo exploration user interface. FIG. 4, FIG. 5, and the other user interface illustrations can be considered to be user interfaces displayed upon electronically generated interactive displays. The components of the user interface presented in FIG. 4 are, first, a representation of a three-dimensional (3D) geometry from a first position and first orientation 400. Here, the representation of a 3D geometry is depicted in a main location in the user interface while other elements of the user interface, e.g. 401, are overlaid and to the sides of the main location. 3D geometry 400 shows a representation of the world as seen from a virtual camera controlled by the user—the 3D geometry is configured to be navigated by a user. In the illustrated embodiment, this representation 400 is not meant to show a photorealistic view of the scene, but rather to display camera positions associated with digital photographs in spatial context and give a sense of the geometry of the true scene. In one embodiment, the 3D geometry 400 may comprise at least one translucent projection of a digital photograph onto said 3D geometry. In FIG. 4, the translucent projections are blended in with the line-drawn building geometry to provide shading and color aspects of the representation 400. FIG. 6 provides a useful example of another embodiment of a translucent projection of a digital photograph 601.

In FIG. 4, the at least one translucent projection of a digital photograph onto 3D geometry 400 provides a more attractive visualization. 3D geometry 400 may also be rendered using a washed-out coloring to give an impression of scene appearance and geometry, but may be abstract enough to be forgiving of the lack of detailed geometry.

In one embodiment, a translucent projection of a digital photograph on a representation such as 400 may be accomplished as follows: For each camera $C_j$, embodiments may first robustly fit a plane to Points($C_j$) using RANSAC. If the number of inliers to the recovered plane is at least 20% of the size of Points($C_j$), embodiments may then fit a robust bounding box, Rectangle($C_j$), to the inliers in the plane. To render the scene, the embodiment may project a blurred, semi-transparent version of each image $I_j$ onto Rectangle($C_j$) and use alpha blending to combine the results. In parts of the scene represented with a sparse number of points, one exemplary system may fall back to point and line rendering.

FIG. 4 illustrates a plurality of drawn points and lines that form the 3D geometry 400 of, in this case, streets, buildings, and the like. The recovered points and lines are used to depict the scene 400 itself. In one embodiment, the points may be rendered with their acquired color and the lines may be drawn with thick black borders, to achieve a line-drawn look. The user can be supplied with one or more user interface tools that control, for example, whether or not the points and lines are drawn, the size of the points, and the thickness of the lines. FIG. 4 also illustrates a map view 401 of the location associated with 3D geometry 400.

FIG. 4 illustrates an example of rendering using projected translucent image projections overlaid with line segments. Here, the translucent projections give the underlying shading and possibly colors, on top of which points and lines may be rendered to complete the 3D geometry. In FIG. 4, camera positions and orientations are rendered within 3D geometry 400 as selectable frusta, e.g. frustum 401. Frustum 401 thus represents a selectable camera position associated with a digital photograph of the location depicted by 3D geometry 400. If a user selects frustum 401, the representation 400 can change to depict an enlarged view of the associated digital photograph, e.g., a view such as 500 in FIG. 5.

The view 500 presented may be the back face of the selected camera frustum 401. In one embodiment, the back face of the frustum 401 can be texture-mapped with an opaque, full-resolution version of the associated photograph, so that the user can see it in detail. The back faces of other cameras' frusta can be texture-mapped with a low-resolution, semi-transparent thumbnail of the photos if the frustum is visible and near the user's current position in the 3D geometry. In another embodiment, they may be rendered with a translucent white color.

FIG. 5 illustrates an enlarged view of a digital photograph 500 in a main location in a user interface. Three exemplary overlay panes are illustrated in FIG. 5. An information and search pane 502 on the left, a thumbnail pane 503 along the bottom, and a map pane 501 in the upper-right corner.

In one embodiment, the information pane 502 appears when the user is visiting a photograph 500. This pane 502 may display information about the photo 500 in the main location, including for example its name, the name of the photographer, and the date and time when it was taken. In addition, the information pane 502 may contain search tools for searching for other photographs with certain geometric relations to the current photo 500.

The thumbnail pane 503 shows a plurality of selectable digital photographs of the location depicted by the 3D geometry 400. The thumbnail pane 503 may show, for example, the results of search operations. The thumbnail pane 503 may be arranged, for example, as a filmstrip of selectable thumbnails as depicted in FIG. 5.

When the user is visiting a camera $C_{curr}$, i.e., when the user is viewing a first photograph in main location 500, and the user selects a thumbnail, e.g. by clicking or mouse-over, the corresponding image $I_j$ can be projected onto a plane the main view 500 to give the user an idea of the content of that image and how it is situated in space. In one embodiment, we pre-compute projection planes, CommonPlane($C_j$; $C_k$), for each pair $C_j$; $C_k$ of cameras, by robustly fitting a plane to Points($C_j$)

U Points($C_k$). The thumbnail panel 503 may also have controls for sorting the current thumbnails by date and time, and viewing the photographs as a slideshow. Finally, the map pane 501 displays an overhead view of scene that tracks the user's movement.

Figure 7:
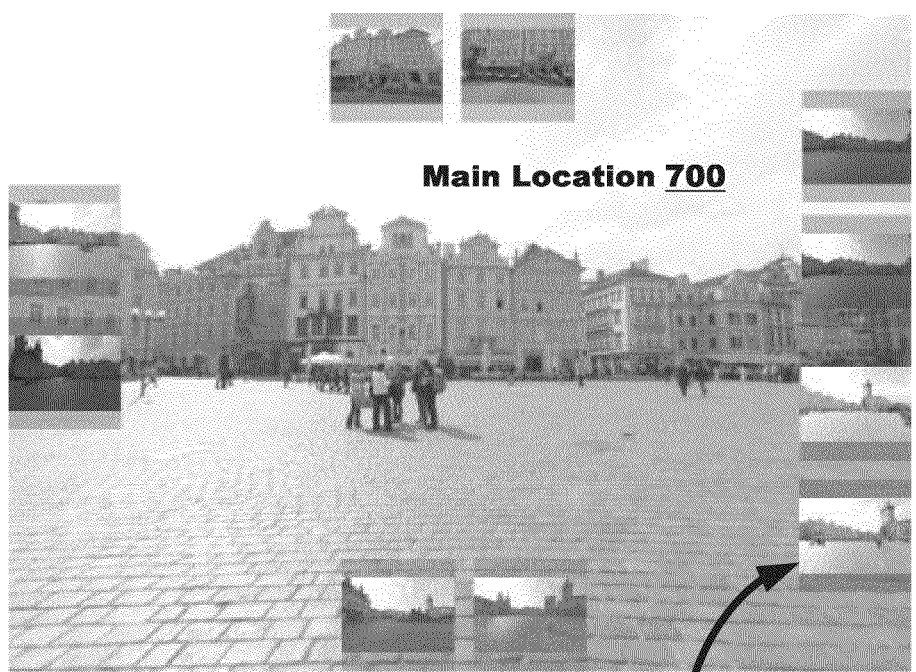
FIG. 7 illustrates another exemplary embodiment of a "image-based" browsing mode such as presented in FIG. 5.

FIGS. 6 and 7 illustrate another exemplary embodiment of user interfaces presented in FIGS. 4 and 5. In FIG. 6, a representation of 3D geometry 600 is presented in which a user can navigate around and view translucent projections of photographs such as 601. FIG. 6 thus provides an exemplary free-flight navigation browsing mode, rendered as a wire frame with photographs shown as frusta floating in space. Here, the translucent projections are depicted on the back panes of frusta within the representation 600. The user may navigate the representation 600 using, for example, arrow keys on the keyboard, mouse or joystick movement. A camera position associated with a digital photograph may be selected by for example, clicking on a frustum and/or translucent projection. Such action may take the user to a view such as that of FIG. 7.

The free-flight navigation mode allows the user to move freely around the location that is depicted by the 3D geometry 600. The goal of this mode is not to render a photorealistic view of the world at all times, but to let the user explore a set of photographs in a natural way, as if they were walking around a museum, pausing at interesting exhibits.

Therefore, the emphasis of this mode is on leading users to photographs that they might be interested in. While the overhead map view can be viewed at many scales, the free-flight navigation mode is meant to explore sets of photographs on scales comparable to that of a city block, town square, or single building.

In this mode, the user controls a virtual camera floating in space among the photographs. As with the overhead map view, the cameras may be rendered as frusta, for example, and a semi-transparent thumbnail may be texture mapped on the "back face" of each frustum. Depending on the type of scene, the scene itself can be rendered in several different ways. If a 3D model of the scene is available, then the model can be used as a stand-in for the scene. For urban scenes, buildings can be rendered in "wireframe" mode using 3D line segments, and the ground can be rendered as a texture mapped satellite image or as a road map. For natural scenes, the ground can be displayed as a height field using topographic data and painted with an appropriate texture.

One set of navigation controls available to the user in this mode can be basic 3D motions (left, right, forward, backwards, up, down, and controls for pitch and yaw), which allow for free motion through the scene. Because the emphasis is on visiting images, the user is notified when they are near a photograph by the appearance of a thumbnail on the border of the window. The placement of the thumbnail indicates the direction the user should go to view that photograph. In addition, the user can allow photographs to exert a "pull" on the virtual camera, so that the camera is automatically drawn towards a photograph that it is approaching. At any time, the user can select a photograph by clicking on a frustum or on one of the thumbnails on the border of the window. Once a photograph is selected, the virtual camera may be smoothly moved to the position and orientation where the selected photograph was taken, and the frustum may be texture-mapped with an opaque full-resolution image.

In FIG. 7, a photograph has been selected, and related views are displayed on the boundary. A photograph is depicted in a main location 700, and a plurality of selectable alternate photographs such as 701 are also depicted. The user may go from a view with a first photo in 700 to a view with an alternate photo 701 in 700 by selecting such alternate photo 701. The transition to such alternate photo may be made smoothly using one of the exemplary transition techniques provided herein.

Transitions Between Photographs

In one embodiment, a user interface such as provided in FIG. 5 may be configured to generate smooth transitions when the user moves between photographs. Information we infer about the photographs such as location, orientation, and sparse correspondence allows us to use camera motion and view interpolation to make transitions more visually compelling and to emphasize the spatial relationships between the photographs. In other words, the system can be configured to display a sequence of transitional views of the location depicted by the 3D geometry 400 prior to transitioning from displaying a first photograph in 500 to displaying a selected digital photograph from 503. The sequence of transitional views of said 3D geometry 400 can be generated by projecting two images onto a common plane and cross-fading between the projected images, as described in greater detail below.

Camera Motion

A variety of 3D games and exploration tools, such as GOOGLE® Earth, use smooth camera motion, rather than sudden cuts, to make transitions more appealing and intuitive. Smooth camera paths may also be used in embodiments of a user interface that implements other aspects of the invention. Such embodiments may also tailor the implementation of smooth transitions in several ways.

When the virtual camera is moved from one photograph to another, by default the camera center may be linearly interpolated between the start and end camera locations and the camera orientation can be linearly interpolated between unit quaternions representing the start and end orientations. The field of view of the virtual camera may also be linearly interpolated so that when it reaches its destination, the destination image will fill as much of the screen as possible. The camera path timing can be non-uniform to ease in and out of the transition. We also fade out all the camera frusta before starting the motion, to avoid flickering caused by the frusta rapidly moving through the view.

If the camera moves as the result of an object selection, the transition can be implemented differently. Before the camera starts moving, it can orient itself to point at the mean of the selected points. The camera can remain pointed at the mean as it moves, so that the selected object stays fixed in the view. This helps keep the object from undergoing large distracting motions during the transition. The end orientation and focal length can be computed so that the selected object is centered and fills the screen.

View Interpolation

During camera transitions, some embodiments may be configured to display in-between images. Two exemplary techniques for morphing between the start and destination photographs are provided below: triangulating the point cloud and using planar impostors. Morphing may be conducted in a variety of contexts. For example, morphing may be conducted to provide a sequence of transitional views when one of the thumbnails in FIG. 5 or FIG. 7 is selected. Morphing may also be conducted when a region within a photo is selected as will be described in greater detail below.

Triangulated Morphs

In one embodiment, to create a triangulated morph between two cameras $C_j$ and $C_k$, we first compute a 2D Delaunay triangulation for image $I_j$ using the projections of Points($C_j$) into $I_j$. The projections of Lines($C_j$) into $I_j$ are imposed as edge constraints on the triangulation. The resulting Delaunay triangulation may not cover the entire image, so we overlay a grid onto the image and add each grid point not contained in the original triangulation. Each added grid point is associated with a "virtual" 3D point on a plane approximating the geometry of the points seen by both $C_j$ and $C_k$. The connectivity of the triangulation is then used to create a 3D mesh from Points($C_j$) and the endpoints of Lines($C_j$). Finally, we texture map the mesh by projecting image $I_j$ onto each triangle. A Delaunay triangulation is also computed for Ck and texture mapped in the same way.

To render an in-between view, each mesh can be rendered from the new viewpoint and blend the two rendered images in proportion to the distance from the in-between camera to the two endpoints. While this technique does not use completely accurate geometry, the meshes are often sufficient to give a good sense of the 3D geometry of the scene. However, missing geometry and outlying points can sometimes cause distracting artifacts, as demonstrated in the accompanying video.

In another embodiment, to provide more context for the relationship between the current and next photos, we use view interpolation for the in-betweens. To render an in-between view, we use the recovered 3D points (and 3D line segments, if available), as a geometric proxies for the scene. First, for each of the two views, we compute a Delaunay triangulation of the projection of each of the 3D points observed by that view. If line segments have been detected, the projections of the endpoints of each line segment visible in that view are added to the triangulation, and the edge between the endpoints is added as a constraint. The resulting Delaunay triangulation may not cover the entire image, so we add additional points to the triangulation on a grid the size of the image. Each grid point that lies outside of the initial Delaunay triangulation is added to the triangulation, and an associated 3D point is added to the 3D point cloud. We position the 3D point either on the ground plane or the plane at infinity, depending on whether a ray from the image center through the grid point intersects the ground plane in front of the image. A visualization of one of the resulting Delaunay triangulations is shown in FIG. 8.

Figure 8:
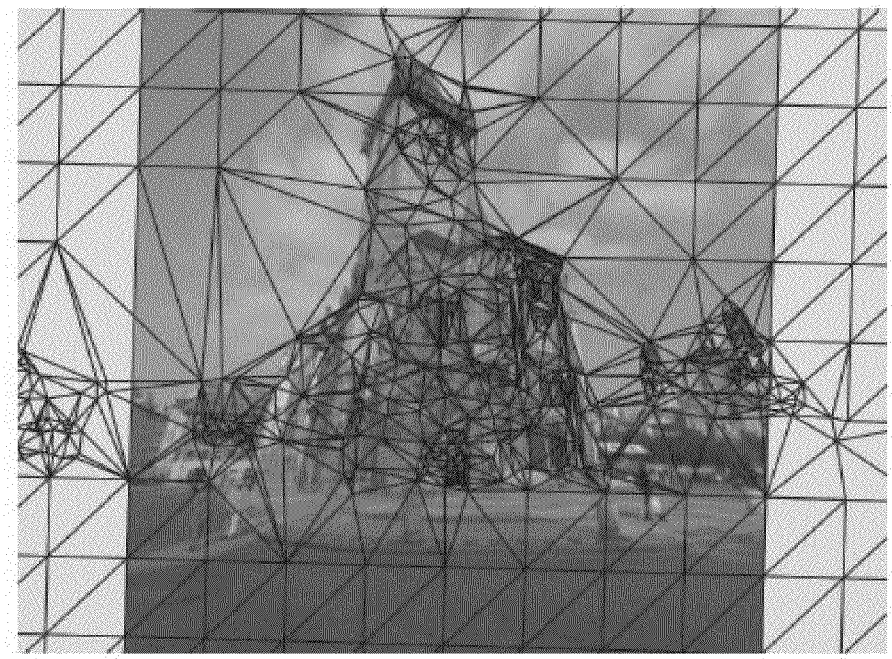
FIG. 8 illustrates a sample triangulation of a set of sparse 3D points and line segments, used for morphing. The triangulation is superimposed on the image that observed the 3D features.

FIG. 8 provides a sample Delaunay triangulation of a set of sparse 3D points and line segments, used for morphing. The triangulation is superimposed on the image that observed the 3D features. Note that outside the extent of the observed features, the points in the triangulation form a grid; these points were added so that the image would be fully covered.

We use the final Delaunay triangulation to introduce connectivity to each of the two 3D point sets. We then texture map the two meshes by projecting the appropriate image onto each mesh and render the two texture-mapped meshes from the in-between viewpoint, blending them in proportion to the distance from the in-between camera to the two endpoints.

Planar Morphs

To create a morph between cameras $C_j$ and $C_k$ using a planar impostor, an exemplary embodiment may, for example, project the two images $I_j$ and $I_k$ onto CommonPlane ($C_j$; $C_k$) and cross-fade between the projected images as the camera moves from $C_j$ to $C_k$. The resulting in-betweens are not as faithful to the underlying geometry as the triangulated morphs, tending to stabilize only a dominant plane in the scene, but the resulting artifacts are usually less objectionable, perhaps because we are used to seeing distortions caused by viewing planes from different angles. Because of the robustness of this method, it is considered a preferred default approach.

There are a few special cases when view interpolation is not used during a transition from image $C_j$ to $C_k$. First, if the cameras observe no common points, certain embodiments may have no basis for interpolating the images. In such embodiments, the system can be configured to fade out the start image, move the camera to the destination as usual, then fade in the destination image. Second, if the cameras are neighbors, but the normal to the plane CommonPlane($C_j$; $C_k$) is nearly perpendicular to the average of Direction($C_j$) and Direction($C_k$), the projected images would undergo a large amount of distortion during the morph. In this case, we revert to using a plane passing through the mean of the points common to both views, whose normal is the average of Direction($C_j$) and Direction($C_k$). Finally, if the vanishing line of CommonPlane($C_j$; $C_k$) is visible in images $I_j$ or $I_k$, it is impossible to project the entirety of $I_j$ or $I_k$ onto the plane. In this case, as much as possible of $I_j$ and $I_k$ can be projected onto the plane, and the rest can be projected onto the plane at infinity.

Overhead Map

FIG. 3 can be used to illustrate an overhead map view. This view can be provided in a main location in a user interface or as a side pane such as in FIGS. 4 and 5. The overhead map view gives the user a birds-eye view of the world. The view can be panned and zoomed in and out or rotated. The cameras may be rendered as frusta superimposed on a satellite image or map, as depicted in the sample screenshot shown in FIG. 3. This browsing mode is useful for getting a summary view of where all the photographs in a particular data set were taken, getting a sense of where the interesting features of a particular location might be, and for quickly finding images of particular objects. To get a clearer view of a subset of the images, the user can use a lasso tool to select a set of images. The view will pan and zoom to focus on the selected images, and thumbnails of the images will appear on the side of the window. The user can also select a single image, and the browser will enter the free-flight navigation mode, with the virtual camera initially pointed at the selected image.

Image-Based Controls

Another set of user interface features that may be provided in embodiments of the invention may be image-based in that they may be used to guide the virtual camera from photograph to photograph. As a preprocessing step, various geometric relations can be defined on a set of photographs. In one embodiment, these relations may include one proximity relation (is-nearby), four directional relations (is-to-the-left-of, is-to-the-right-of, is-in-front-of, is-in-back-of), and two level-of-detail relations (is-a-zoom-in-of, is-a-zoom-out-of), and are computed based on camera proximity, whether the cameras are pointed in the roughly same direction, and the angle between the direction two cameras are pointing and their displacement. When the virtual camera is coincident with one of the photographs in the scene, the photographs that are related to the current photo are displayed either as thumbnails on the border of the screen (in the case of the directional relations), as highlighted regions inside the current photograph (the is-a-zoom-in-of relation), or in a box on the side of the screen (the is-nearby and is a-zoom-out-of relations).

FIG. 7, for example, shows a screenshot containing a main photograph in main location 700 surrounded by related thumbnails such as 701. These controls can be used to find photographs similar to the current photo, to see what the scene looks like from a slightly different vantage point, to explore a photo in more detail, or get a broader view.

Similarly, FIG. 5 illustrates a system for navigating among a plurality of images, comprising an electronically generated interactive display (user interface) with a first digital photograph displayed at a main location 500 within said display, wherein said first digital photograph comprises first image content. Here, the first image content comprises the street, buildings, church spires, sky and so forth. At least one selectable alternate digital photograph is displayed at a second location 503 within said display, wherein said alternate digital photograph comprises image content that is overlapping or proximal to said first image content. For example, an alternate photo in 503 may comprise image content with a close-up view of part of the image in 500, or with a view to the left, to the right, or simply substantially overlapping the photo in 500. Upon selection of a selectable alternate digital photograph from 503, the system is configured to display transitional image content, as described in the "view interpolation" and subsequent sections, in said main location 500 prior to displaying the alternate digital photograph in said main location 500. Displaying transitional content allows for smooth, intuitive changes from a first photo in 500 to a second photo in 500.

When visiting a photograph $C_{curr}$, the user has a snapshot of a location from a single point of view and an instant in time. The user can pan and zoom to explore the photo, but might also want to see aspects of the scene beyond those captured in a single picture; he or she might wonder, for instance, what lies just outside the field of view, or to the left of the objects in the photo, or what the scene looks like at a different time of day.

Figure 9:
FIG. 9 illustrates an exemplary information and search pane comprising a plurality of search tools that may be incorporated into embodiments of the invention.

To make it easier to find related views such as these, an embodiment of the invention can provide the user with one or more "geometric" tools. Icons associated with these tools may appear, for example, in two rows in the information pane 502 in FIG. 5, which pops up when the user is visiting a photograph. A close up view of tools that may be presented in 502 is provided in FIG. 9, comprising information and selectable tools pane 900. To implement these tools, an exemplary implementation may take a scene-centered, as opposed to a camera-centered, approach. In other words, these tools can find photos that depict parts of the scene with certain spatial relations to what is currently in the main location 500 view.

One mechanism for implementing these search tools is to project the points observed by a current camera, Points($C_{curr}$) into other photos in an image set or database, or vice versa. A view may be selected based on the projected motion of the points. For instance, to answer the query "show me what's to the left of this photo," the system can be configured to attempt to find a photo in which Points($C_{curr}$) appear to have moved right. In these "geometric" searches, new images are selected from the set of neighbors of the current photo. We define the neighbors of C to be the set of cameras that observe at least one point in common with C, i.e., Neighbors(C)={$C_j$|Points($C_j$)∩Points(C)≠0}

A first row exemplary row of tools 910 can find related images at different scales. These tools select images by estimating visibility and "how large" a set of points appears in different views. Because we do not have complete knowledge of the geometry of the scene, to check the visibility of a point in a camera we simply check whether the point projects inside the camera's field of view. To estimate the apparent size of a point set in an image, we project the points into that view, find the axis-aligned bounding box of the projections, and calculate the ratio of the area of the bounding box (in pixels) to the area of the image.

A first exemplary tool 911 finds details, or higher-resolution close-ups, of the current photo, and is useful for quickly finding out which objects in the current view can be seen in more detail. One exemplary implementation may deem a neighbor $C_j$ of $C_{curr}$ a detail if most points in Points($C_j$) are visible in $C_j$ and the apparent size of Points($C_j$) in image is less than 0.75. The details may be sorted by increasing apparent size and displayed in the thumbnail pane. This tool 911 thus finds alternate digital photographs comprising image content with a close-up view of at least one portion of first image content in a main location such as 500 in FIG. 5.

The second exemplary tool 912 finds similar photos, and is useful for comparing similar views of an object which differ in other respects, such as time of day, season, year, and so on. For this operation, one exemplary implementation may deem a neighbor $C_j$ to be similar to $C_{curr}$ if most points in Points ($C_{curr}$) re visible in $C_j$, the apparent size of Points($C_{curr}$) in $C_j$ is within 30% of the apparent size of Points($C_{curr}$) in $C_{curr}$ itself, and the angle between the two camera's viewing directions is less than a threshold. This search tool 912 thus finds alternate digital photographs which can be placed in a location such as 503, and which may comprise image content that is overlapping substantially all of the first image content of the image in main location 500 without substantial additional image content. S Such alternate photographs may be usefully sequenced according to a time when said alternate digital photographs were captured, if available from the metadata associated with the photo, e.g., from the EXIF tags. This may be usefully coupled with a selectable slideshow tool 940 for causing the system to sequentially display, for example, a plurality of digital photographs in the main location 500, said plurality of digital photographs consisting substantially of the same content as the first image in the main location 500, and varying in a time when said digital photographs were captured. Slide shows and stabilized slideshows are discussed further below.

The third exemplary tool 913 finds photographs that are "zoom-outs" of the current image, i.e., photos that show more surrounding context. One exemplary implementation may deem a neighbor $C_j$ of $C_{curr}$ to be a zoom-out of $C_{curr}$ if the apparent size of Points($C_{curr}$) in $I_j$ is smaller than the apparent size of Points($C_{curr}$) in $I_{curr}$ itself. The zoom-outs are sorted by increasing bounding box area. A search tool 913 thus finds alternate digital photographs comprising image content that is overlapping substantially all of the first image content in a main location 500, and further comprising substantial additional image content, thereby providing a zoomed-out view of said first image content.

A second exemplary set of tools 920 may give the user a simple way to "step" left 921 or right 922, up 924, or down 925, i.e., to see more of the scene in a particular direction. For each camera, a "left" and "right" image may, in some embodiments, be precomputed, and displayed them as thumbnails 921a-925a. To find a left and right image for camera $C_j$, embodiments may compute the average 2D flow $m_{jk}$ of the projections of Points($C_j$) from image Ij to each neighboring image $I_k$. If the angle between $m_{jk}$ and the desired direction is small (and the apparent size of Points($C_j$) in both images is comparable), then $C_k$ is a candidate left or right image. Out of all the candidates, one embodiment may, for example, select the image $I_k$ whose motion magnitude $\|m_{jk}\|$ is closest to 10% of the width of image $I_j$. Tools 921 and 922 may provide, for example, at least two selectable alternate digital photographs 921a and 922a, a first alternate digital photograph 921a comprising image content proximal to a left side of first image content in a main location 500, and a second alternate digital photograph 922a comprising image content proximal to a right side of such first image content.

Along with the left and right cameras, one embodiment may show a "step back" camera, which is a shortcut to the first "zoom-out" chosen by the procedure described above.

Interactive Tours

Additional exemplary features of a user interface implemented using the systems and methods discussed herein may be directed to a browsing mode that supports interactive tours. This mode is similar to the free-flight navigation mode, in that the user is guided from photograph to photograph, but the controls may be, in some embodiments, more restricted and the experience may have been pre-authored. This mode is analogous to a slideshow, but the system can be configured with additional features to provide a more interactive experience with more context. As in the free-flight navigation tool, a set of relations may be created on a set of images, either automatically or manually using an authoring tool. The user can then explore the image set using the image-based controls described in the previous section, or may wish to be automatically guided along a tour through the photographs.

Again, view interpolation as described above may be used to add context to the transitions between photographs. At each photograph (each stop along the tour), the user may pause for some time, zoom and pan around the image or panorama, and may access more information about the objects in the photograph, before moving to the next stop.

Embodiments may further support a second, object-based, type of tour. The user can choose to fix a specific object, such as the face of a building, in the center of the view, and view a set of photographs in which that object is visible. Instead of the viewpoint changing, however, the photographs are warped so as to stabilize the object of interest. This type of tour gives a clearer indication of how a particular object was viewed by different people at different times. The interactive tour mode is especially useful in situations where a photographer wishes to author the experience of users browsing a particular collection of photographs. For instance, a realtor might create a compelling demonstration of a home by authoring a tour of a set of photographs of the interior of the home.

In addition to the above, whenever a thumbnails pane such as 503 in FIG. 5 contains more than one image, its contents can be viewed as a slideshow by pressing a play button on the pane. By default, in one embodiment, the virtual camera may move through space from camera position to camera position, pausing at each image for a few seconds before proceeding to the next.

The user can also lock the camera, fixing it to the its current position, orientation, and field of view. When the images in the thumbnail pane are all taken from approximately the same location, this locked mode stabilizes the images, making it easier to compare one image to the next. This mode is useful for studying changes in scene appearance as a function of time of day, season, year, weather patterns, etc. In addition to being able to view search results as a slideshow, the user can load in and view a previously saved sequence of images. This feature can be used to interactively view tours authored by other users.

Object-Based Browsing

Additional exemplary features of a user interface implemented using the systems and methods discussed herein may be directed to object-based browsing. The set of controls in the object-based browsing modes may be object-based. In this mode, the user can select an object, i.e., a particular portion of image content, in a photo by either clicking on it or dragging a box around it. Because the system has knowledge of correspondence between parts of different images, embodiments may be configured to determine approximately where an object of interest is in other images. Therefore, based on the user's selection, the system can present the user with a list of thumbnails of other views of that object. Such embodiments may also automatically select a "good" image of the object of interest, based on criteria such as blurriness, lighting, and how centered and in focus the object appears.

In this regard, a search query that may be supported in an exemplary system is search object 930, which effectively asks the system to "show me photos of this object," where the object in question can be directly selected in a photograph or in the point cloud. This type of search has certain advantages over keyword search. Being able to select an object is especially useful when exploring a scene—when the user comes across an interesting object, direct selection is an intuitive way to find a better picture of that object.

In one exemplary embodiment, the user selects the search object tool 930, then selects an object by dragging a 2D rectangular box around a region of the current photo, or around a region of the point cloud. All points whose projections are inside the box are considered selected. The system then takes over, searching for the "best" picture of the selected points. Each image in the database can be scored based on how good a representation it is of the selection. The top scoring photo may be selected as the representative view, and the virtual camera may be moved to that image. The rest of the images with scores above a threshold are displayed in the thumbnail pane, sorted by descending score.

Figure 10:
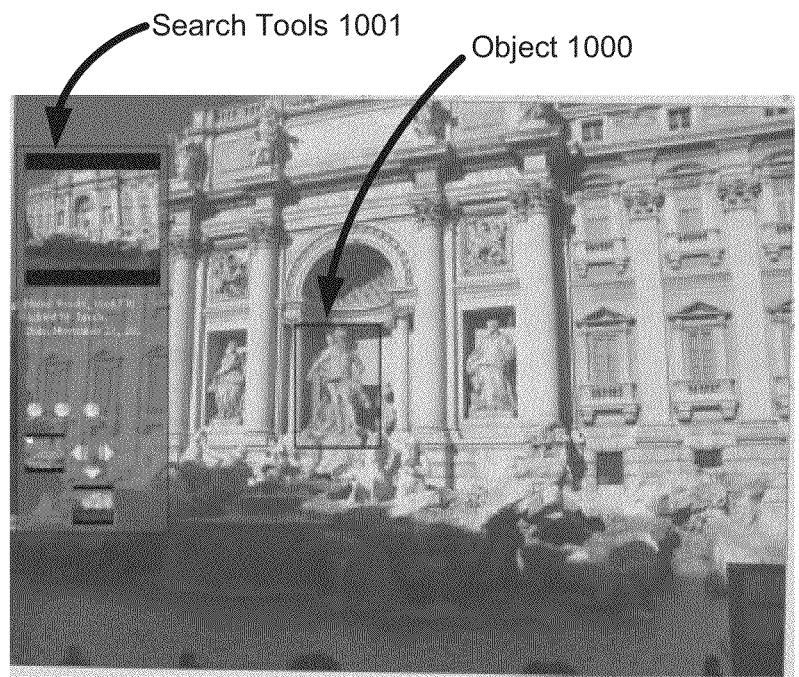
FIG. 10 illustrates a plurality of user interface features in an exemplary "object-based" browsing mode, in which a user can select an object and find other images also containing the object, and moreover may sort images by which have "best" views of the selected object.
Figure 11:
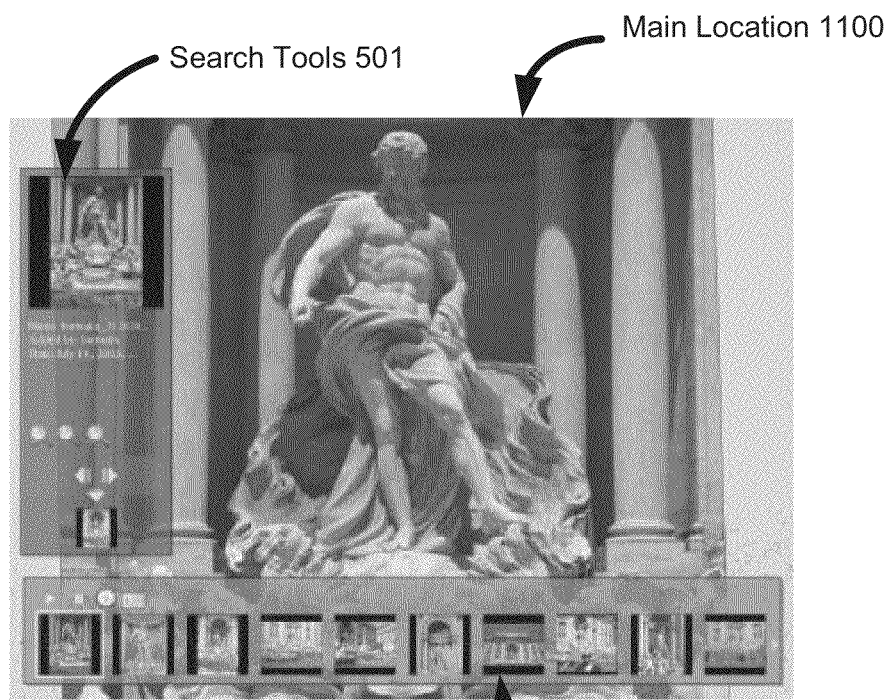
FIG. 11 illustrates a plurality of user interface features in an exemplary "object-based" browsing mode, in which a user selected an object in FIG. 10, and was presented with a best view of the object in FIG. 11 along with a plurality of other views of the object in 1102, which may be ordered according to which have best views of object 1000.

An example interaction is shown in FIGS. 10 and 11. FIGS. 10 and 11 are user interfaces presented by a system for navigating among a plurality of images. As with the other user interfaces discussed herein, they may be accessed via an electronically generated interactive display in which a user can move a selection pointer or the like to control the contents of the display. In FIG. 10, an image is located within the main location 1002 of a user interface display. The image in 1002 comprises image content, here, the various windows and columns of a building, an archway and a statue within the archway. The search tools 1001 may, in one embodiment, comprise tools such as those illustrated in FIG. 9. Exemplary aspects of search tools 1001 may comprise, for example, photograph information 1010, search object 1011, zoom in, zoom out, or view photo in full size 1012, and step left, step right, and step back 1013. The user may use the appropriate tool such as 1012 to select a portion of the image content in 1002, e.g. object 1000, comprising the statute within the archway.

The system may have stored alternate images also comprising image content from the photo in 1000, and can search through its various images for such content. In some embodiments, related photos may be pre-indexed. In other embodiments, a search may be conducted "on the fly." Upon activation by a user of an appropriate tool, the system can search among said stored alternate images for a best view of a selected portion 1000 of said image content in 1002.

In one embodiment, a best view can be defined as described above, namely as at least one of: a view from a direction that is most closely perpendicular to a plane associated with said portion of image content 1000, a view in which a greatest number of points associated with the selected portion of said image content 1000 are visible, and a view comprising a greatest amount of detail associated with said portion of image content 1000.

In one embodiment, the system may be configured to score stored alternate images according to which have the "best view" of the selected portion of said image content 1000. Turning to FIG. 11, the highest scoring image is placed in main location 1100, while the other images may be displayed in a sequence 1102 corresponding to a score value associated with each displayed image. In sequence 1102, higher scoring images may, for example, be placed to the left, while lower scoring images are pushed to the right.

Any function that rates the "goodness" of an image with respect to a selection can be used as the scoring function. One exemplary function may be based on three criteria: 1) the selected points are visible, 2) the object is viewed from a good angle, and 3) the object appears in sufficient detail. For each image $I_j$, we compute the score as a weighted sum of three terms, $E_{visible}$, $E_{angle}$, and $E_{detail}$.

When evaluating the scoring function to determine how well an image represents a point select, the score for each image $I_j$ can be, for example, a weighted sum of three terms, $E_{visible}+E_{angle}+E_{detail}$ (e.g., using $\alpha=\frac{1}{3}$ and $\beta=\frac{2}{3}$).

To compute $E_{visible}$, such an embodiment may first check whether $P_{inliers} \cap Points(C_j)$ is empty. If it is empty, then the object can be deemed not to be visible to $C_j$ at all, and $E_{visible}=-\infty$. Otherwise, $$E_{visible} = \frac{n_{inside}}{|P_{inliers}|}$$

where $n_{inside}$ denotes the number of points in $P_{inliers}$ that project inside the boundary of image $I_j$.

Next, to compute $E_{angle}$, an exemplary embodiment may first attempt to find a dominant plane in $P_{inliers}$ by fitting a plane to the points using orthogonal regression inside a RANSAC loop. If the plane fits most of the points fairly tightly, i.e., if the percentage of points in $P_{inliers}$ is above a threshold of 30%, it can be advantageous to favor cameras that view the object head-on (i.e., with the camera pointing parallel to the normal, n̂ to the plane), by setting:

$$E_{angle}=Direction(C_j) \cdot \hat{n}.$$

If enough points do not fit a plane, we set $E_{angle}=0$.

Finally, such embodiments may compute $E_{detail}$ to be the area, in pixels, of the bounding box of the projections of $P_{inliers}$ into image $I_j$ (considering only points that project inside the boundary of $I_j$). $E_{detail}$ is normalized by the area of the largest such bounding box of all images.

A point selection can sometimes contain points that the user did not intend to select. In particular, it may include occluded points that happen to project inside the selection rectangle. Because the full scene geometry is unknown, it is difficult to test for visibility. To avoid problems due to larger-than-intended selections, one exemplary embodiment may first prune the point set to remove likely occluded pixels. In particular, if the selection was made while visiting an image $I_j$ (and is contained in the image boundary), points can be used that are known to be visible from that viewpoint ($Points(C_j)$) to refine the selection. Such embodiments may then compute the 3×3 covariance matrix for the selected points that are also in $Points(C_j)$, and remove points with a Mahalanobis distance greater than 1.2. If the selection was made directly on the projected point cloud (i.e., not on an image) the covariance matrix may be defined with respect to the entire selected point set.

Browsing with Metadata

Exemplary systems may implement user interface features that allow users to browse with metadata and transfer metadata among photographs in novel ways. Such features may be particularly useful for large data set, e.g. with hundreds or even thousands of photographs, or for data sets that exhibit significant variation in attributes such as time. In such scenarios, it may be useful and informative to organize images along other axes in addition to location. FLICKR® and other photo-sharing web sites use a variety of different metadata to organize photos, including data, photographer, and user-specified tags. Embodiments of the invention may integrate these metadata into the system, in addition to the various other novel metadata and uses thereof described below. When combined with knowledge of location, these metadata allow for powerful new browsing features.

Figure 12:
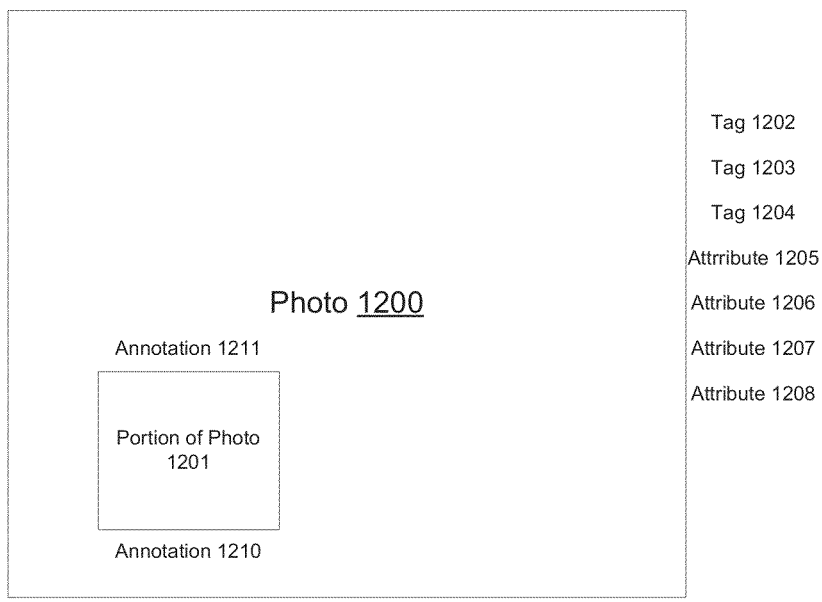
FIG. 12 illustrates an exemplary digital photograph 1200 which may be presented in various user interfaces presented herein, and metadata relating to image attributes, tags, and annotations to portions of the photograph which may also be presented along with the photograph 1200.

In one embodiment, as illustrated in FIG. 12, a system may be configured to distinguish between two kinds of metadata: those that are intrinsic to the image itself, including attributes 1205-1208 like date and photographer, and those that are created by the users of the system. Among the latter, there can be two kinds of metadata a user can attach to a photo: tags 1202-1204, which apply to the entire photo 1200, and annotations 1210-1211, which describe specific parts of a photograph 1201. Each of these allows for different types of features, which may be integrated with the other browsing modes in different ways.

First, both intrinsic attributes 1205-1208 and tags 1202-1204 can be displayed alongside the images 1200 themselves in the various browsing modes. The desired metadata can be rendered as floating strings next to each photograph 1200. The user can also choose to display only photographs that meet certain criteria, such as photos taken in a range of dates, shot by a particular person, or described by a specific tag 1202-1204 or attribute 1205-1208. When a photograph 1200 has been selected and is centered in a view, the user can see the annotations 1210-1211 that have been attached to that photograph 1200, highlighted by rectangles. In some embodiments, when the user hovers the mouse over an annotated region 1201, an annotation 1210 may appear as a tooltip.

Figure 13:
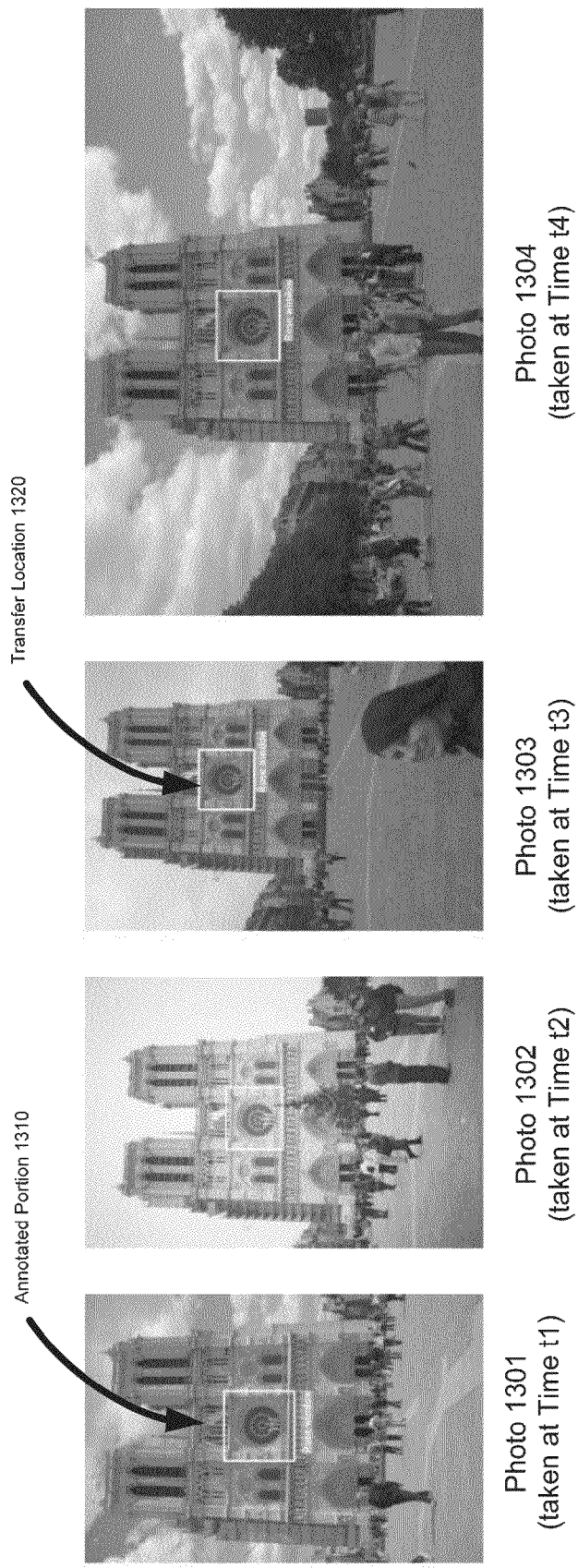
FIG. 13 illustrates images from a Notre Dame data set showing the cathedral from approximately the same viewpoint, but at different times. The various images 1301-1304 may be presented in a stabilized slide show. The annotation of the rose window 1310 has been transferred from image 1301 to the other three images 1302-1304.

Second, in one embodiment as illustrated in FIG. 13, as a special kind of interactive tour, a user can choose to view a set of photographs 1301-1304 based on location and other metadata. For instance, a user might wish to see all the photographs taken near a particular location, here, photos 1301-1304 of the front of the Notre Dame cathedral, in chronological order, perhaps to see how a building has changed over time, or how a natural setting looks throughout the year.

Third, because we have knowledge of location and a sparse 3D point cloud, a special feature of some embodiments may be to transfer annotations, e.g. an annotation attached to the rose window annotated portion from one photograph 1301, to another 1302-1304 (a kind of digital graffiti). For instance, when a user annotates a portion 1310 of a photograph 1301, the set of pixels they highlight 1310 may include the projections of some known 3D points—assuming the points are not occluded. These points may also be visible in other images 1302-1304, and therefore we know approximately where to place the same annotation in those images. For example, an annotation may be transferred to transfer location 1320 in photo 1303.

Finally, tags and annotations such as those illustrated in FIG. 12 may comprise links to additional information can be attached to images or parts of images. These tags can include hyperlinks to related web sites, as well as expert information from guidebooks, scanned maps of the area, and audio files.

Embodiments may thus allow users to add content to a scene in several ways. First, the user can register their own photographs to the scene at run-time, after the initial set of photographs has been registered. Second, users can annotate regions of images, and these annotations can be propagated to other images.

As discussed above, new photographs can registered on the fly, as follows. First, the user may switch to a mode where an overhead map such as that in FIG. 3 fills the view. The user may open a set of images 301-303, which are displayed in the thumbnail panel 300, and drag and drop an image 301 onto its approximate location on the map. After the desired images 301-303 have been dropped, the system may be configured to estimate the location, orientation, and focal length of each new photo 301-303 by running an abbreviated version of the structure from motion pipeline described above at a local level. First, SIFT keypoints may be extracted and matched to the keypoints of the twenty cameras closest to the initial location; the matches to each other camera can be pruned to contain geometrically consistent matches; the existing 3D points corresponding to the matches may be identified; and finally, these matches can be used to refine the pose of the new camera. After a set of photos have been dragged onto the map, it generally takes around ten seconds to optimize the parameters for each new camera on our test machine, a 3.40 GHz Intel Pentium 4.

As explained above, a unique feature of embodiments of the invention is that annotations can be automatically transferred from one image to other images that contain the same scene region(s). Returning to FIG. 13, a user can select a region 1310 of an image and enter a text annotation. That annotation is then stored, along with the selected points, and appears as a semi-transparent rectangular box around the selected points. Once annotated, an object can also be linked to other sources of information, such as web sites, guidebooks, and video and audio clips. When an annotation is created, it may be automatically transferred to all other relevant photographs 1302-1304.

To determine if an annotation is appropriate for a given camera $C_j$, embodiments may check for visibility and scale. To determine visibility, one exemplary embodiment can test that at least one of the annotated points is in Points($C_j$). To check that the annotation is at an appropriate scale for the image, the apparent size of the annotation in image $I_j$ can be determined For example, if the annotation is visible and the apparent size is greater than 0.05 (to avoid barely visible annotations), and less than 0.8 (to avoid annotations that take up the entire image), one embodiment may transfer the annotation to $C_j$. When the user visits $C_j$, the annotation can be displayed as a box around the projections of the annotated points, with the label in the center of the box.

Besides quickly enhancing a scene with semantic information, the ability to transfer annotations has several applications. First, it enables a system in which a tourist can take a photo (e.g., from a camera phone that runs software according to an aspect of the invention) and instantly see information about objects in the scene super-imposed on the captured image. In combination with a head-mounted display, such a capability could offer a highly portable, computer-vision-based augmented reality system.

Second, it makes labeling photographs in preparation for keyword search more efficient. If an object is annotated with a set of keywords in one photo, transferring the annotation to other photographs enables multiple images to be added to a keyword search database based on a single annotation. We can also leverage the many existing images that have already been annotated. There are several sources of existing annotations. On FLICKR®, for instance, users can attach notes to rectangular regions of photographs. Tools such as LabelMe encourage users to label images on the web, and have accumulated a database of annotations. By registering such labeled images with an existing collection of photographs using our system, we can potentially transfer the existing labels to every other photograph in the system, thereby integrating photo information as never before. Other images on the web are implicitly annotated. For instance, an image appearing on a Wikipedia page is annotated with the URL of that page. By registering such images, we can link other photographs to the same page.

Application Scenarios

In this section, we enumerate several scenarios where the techniques described herein could be used. First, various aspects of the invention could be used to augment a user's own collection of photographs. If the photos were taken in a few common locations (a home, for instance), embodiments of the invention can be an effective way to organize and visualize these photos. The user can also label parts of buildings or areas in a house, for instance, and these labels will be automatically transferred to other photographs. The user can also easily find photos of a particular location, or have the system choose a "best" photo of that location, given criteria for evaluating different photographs. The user can also use our tools to show their pictures to other people in a way that can be more informative and engaging than a normal slideshow or photo album.

Second, embodiments could be used to browse photos either gathered automatically from crawling the web or contributed by many users to a central database. The number of photographs available online is already very large and will only grow larger as more people start posting photographs on the Internet. Many, though not all, of these photos can be identified by location, especially those depicting famous buildings or natural landmarks, and are therefore amenable to the techniques we have described. By combining photographs from many users (perhaps registering them using a .skeleton. model created by photographs taken by an expert for this purpose), detailed image-based models can be built of such scenes, and can be explored in compelling ways along axes such as time and space. New users can upload their own photographs and see how they fit in with everybody else's, can see other user's annotations on their photos, and can access additional information through links to web pages and guidebooks.

Finally, embodiments could be used to provide real-time information about a location to tourists or people unfamiliar with a particular place. If a person encounters an building or landmark of interest, we envision that he or she could simply snap a photo of it, have the photo be automatically uploaded to a server for processing, and quickly receive information about where they are standing. Our system also allows the user's photo to be automatically annotated with additional information, such as names of buildings and objects, historical notes, and other users' comments.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

The invention claimed is:

1. A method comprising:

providing, by a server, instructions to display a first digital photograph at a main location within a display, said first digital photograph comprising first image content;

providing, by said server, at least one selectable alternate digital photograph displayed at a second location within said display, wherein said selectable alternate digital photograph comprises image content that is at least one of: overlapping to said first image content or proximal to said first image content; and responsive to selection of said selectable alternate digital photograph, providing instructions to display transitional image content in said main location prior to displaying said selectable alternate digital photograph in said main location, wherein said second location within said display is a location that is overlaid on top of the first digital photograph such that said image content in said selectable alternate digital photograph overlaps corresponding first image content.

2. The method of claim 1, further comprising:
providing a search tool for finding alternate digital photographs comprising image content with a close-up view of at least one portion of said first image content.

3. The method of claim 1, further comprising:
providing, a search tool for finding alternate digital photographs comprising image content that is overlapping substantially all of said first image content without substantial additional image content.

4. The method of claim 1, further comprising:
sequencing a plurality of alternate digital photographs according to a time when said plurality of alternate digital photographs were captured.

5. The method of claim 1, further comprising:
providing a search tool for finding alternate digital photographs comprising image content that is overlapping substantially all of said first image content and further comprising substantial additional image content, thereby providing a zoomed-out view of said first image content.

6. The method of claim 1, wherein said at least one selectable alternate digital photograph comprises at least two selectable alternate digital photographs, a first alternate digital photograph comprising image content proximal to a left side of said first image content, and a second alternate digital photograph comprising image content proximal to a right side of said first image content.

7. The method of claim 1, further comprising:
providing a selectable slideshow tool that effectuates a sequential display of a plurality of digital photographs in said main location, said plurality of digital photographs varying in either a time when said plurality of digital photographs were captured or a viewpoint from which said plurality of digital photographs were captured.

8. The method of claim 7, wherein said plurality of digital photographs are geometrically stabilized by projecting them onto a common plane in the main location within said display.

9. The method of claim 1, further comprising:
providing a plurality of stored alternate images also comprising said first image content; and
providing a tool for searching among said plurality of stored alternate images for a best view of a selected portion of said first image content, wherein said best view is defined as at least one of: a view from a direction that is most closely perpendicular to a plane associated with said image content, a view in which a greatest number of points associated with the selected portion of said first image content are visible, or a view comprising a greatest amount of detail associated with said first image content.

10. The method of claim 1,
providing a score of stored alternate images according to best view of said selected portion of said first image content.

11. The method of claim 1, further comprising:
displaying a plurality of stored alternate images in a sequence corresponding to a score value associated with each displayed image.

12. A method comprising:
providing, by a server, instructions to display a first digital photograph at a main location within a display, wherein said first digital photograph comprising first image content;

providing, by said server, at least one selectable alternate digital photograph displayed at a second location within said display, wherein said alternate digital photograph comprises image content that is at least one of: overlapping to said first image content or proximal to said first image content; and responsive to selection of said selectable alternate digital photograph, providing instructions to display transitional image content in said main location prior to displaying said alternate digital photograph in said main location;

providing a selectable slideshow tool that effectuates a sequential display of a plurality of digital photographs in said main location, said plurality of digital photographs varying in either a time when said plurality of digital photographs were captured or a viewpoint from which said plurality of digital photographs were captured, wherein said plurality of digital photographs are geometrically stabilized by projecting them onto a common plane in the main location within said display.

13. The method of claim 12, wherein said second location within said display is a location that is overlaid on top of the first digital photograph such that image content in said selectable alternate digital photograph overlaps corresponding first image content.

14. The method of claim 12, further comprising:
providing a search tool for finding alternate digital photographs comprising image content with a close-up view of at least one portion of said first image content.

15. The method of claim 12, further comprising:
providing, a search tool for finding alternate digital photographs comprising image content that is overlapping substantially all of said first image content without substantial additional image content.

16. A method comprising:
providing, by a server, instructions to display a first digital photograph at a main location within a display, wherein said first digital photograph comprising first image content;

providing, by said server, at least one selectable alternate digital photograph displayed at a second location within said display, wherein said alternate digital photograph comprises image content that is at least one of: overlapping to said first image content or proximal to said first image content; and responsive to selection of said selectable alternate digital photograph, providing instructions to display transitional image content in said main location prior to displaying said alternate digital photograph in said main location;

providing a plurality of stored alternate images also comprising said first image content; and providing a tool for searching among said stored plurality of alternate images for a best view of a selected portion of said first image content, wherein said best view is defined as at least one of: a view from a direction that is most closely perpendicular to a plane associated with said image content, a view in which a greatest number of points associated with the selected portion of said first image content are visible, or a view comprising a greatest amount of detail associated with said first image content.

17. The method of claim 16,
providing a score of stored alternate images according to said best view of said selected portion of said first image content.

18. The method of claim 16, further comprising:
displaying the plurality of stored alternate images in a sequence corresponding to a score value associated with each displayed image.

19. The method of claim 16, further comprising:
providing a search tool for finding alternate digital photographs comprising image content that is overlapping substantially all of said first image content and further comprising substantial additional image content, thereby providing a zoomed-out view of said first image content.

20. The method of claim 16, wherein said at least one selectable alternate digital photograph comprises at least two selectable alternate digital photographs, a first alternate digital photograph comprising image content proximal to a left side of said first image content, and a second alternate digital photograph comprising image content proximal to a right side of said first image content.

\* \* \* \* \*